(12) United States Patent
Shiraiwa et al.

(10) Patent No.: US 9,127,832 B2
(45) Date of Patent: Sep. 8, 2015

(54) LIGHT SOURCE SUPPORT APPARATUS AND OPTICAL RADIATION CHARACTERISTIC MEASUREMENT APPARATUS USING THE SAME

(71) Applicant: Otsuka Electronics Co., Ltd., Hirakata-shi, Osaka (JP)

(72) Inventors: Hisashi Shiraiwa, Koka (JP); Takeshi Kamada, Koka (JP)

(73) Assignee: OTSUKA ELECTRONICS CO., LTD., Hirakata-Shi (JP)

( * ) Notice: Subject to any disclaimer, the term of this patent is extended or adjusted under 35 U.S.C. 154(b) by 305 days.

(21) Appl. No.: 13/753,521

(22) Filed: Jan. 30, 2013

(65) Prior Publication Data

US 2013/0214120 A1    Aug. 22, 2013

(30) Foreign Application Priority Data

Feb. 22, 2012    (JP) ................. 2012-036087

(51) Int. Cl.
*G01J 1/02*    (2006.01)
*F21V 21/14*    (2006.01)
*G01J 1/42*    (2006.01)

(52) U.S. Cl.
CPC .............. *F21V 21/14* (2013.01); *G01J 1/0223* (2013.01); *G01J 1/0228* (2013.01); *G01J 1/0242* (2013.01); *G01J 2001/4247* (2013.01)

(58) Field of Classification Search
CPC .................. G01J 1/0223; G01J 1/0242; G01J 2001/4247; F21V 21/14
See application file for complete search history.

(56) References Cited

U.S. PATENT DOCUMENTS 8,348,483 B2 * 1/2013 Lin .............................. 362/427

FOREIGN PATENT DOCUMENTS

| JP | 62-250325 | 10/1987 |
| JP | 05-281023 | 10/1993 |
| JP | 07-294328 | 11/1995 |
| JP | 2000-258246 | 9/2000 |
| JP | 2003-247888 | 9/2003 |
| JP | 2005-172665 | 6/2005 |
| JP | 2009-150791 | 7/2009 |

* cited by examiner

*Primary Examiner* — Tony Ko
(74) *Attorney, Agent, or Firm* — Mori & Ward, LLP

(57) ABSTRACT

A light source support apparatus includes: a base member; a first support member supporting the base member rotatably about a first axis; first and second arm members connected respectively to opposite ends of the base member and extending in a direction parallel to the first axis; and a pair of second support members disposed at respective positions, which are opposite to each other, of the first and second arm members for supporting a sample light source. The pair of second support members is configured to be able to rotate the supported sample light source about a second axis orthogonal to the first axis. At least one of the first and second arm members is configured to be attachable to and detachable from the base member.

12 Claims, 18 Drawing Sheets

LIGHT SOURCE SUPPORT APPARATUS AND OPTICAL RADIATION CHARACTERISTIC MEASUREMENT APPARATUS USING THE SAME

BACKGROUND OF THE INVENTION

1. Field of the Invention

The present invention relates to a light source support apparatus directed to measurement of the radiation characteristic of light emitted from a light source, and to an optical radiation characteristic measurement apparatus using the light source support apparatus.

2. Description of the Background Art

As an indicator for evaluating the performance of a light source, a measurement of the optical radiation characteristic is known. The luminous intensity distribution characteristic is a typical example of such a measurement of the optical radiation characteristic. The luminous intensity distribution characteristic means a spatial distribution of the luminous intensity of a light source. As such a luminous intensity distribution characteristic, both the absolute-value-based luminous intensity distribution and the relative-value-based luminous intensity distribution are used. The absolute-value-based luminous intensity distribution is a measurement of the spatial distribution of the absolute value of the luminous intensity and is used in such a case where the total luminous flux generated by a light source is to be determined. In contrast, the relative-value-based luminous intensity distribution is a measurement of the spatial distribution of the relative value of the luminous intensity, and is used in such a case where the luminous intensity distribution pattern is to be determined. Generally, it is not easy to measure the luminous intensity distribution characteristic of light sources such as a light source having a complicated luminous intensity distribution pattern and a light source whose optical characteristics and the like are not known.

Regarding such a measurement of the luminous intensity distribution, Japanese Patent Laying-Open Nos. 05-281023, 2005-172665, and 2009-150791, for example, each disclose a configuration for simultaneously measuring respective luminous intensities of a light source at a plurality of different positions in a predetermined irradiation space. The configurations disclosed in these prior art documents cannot be used to measure the luminous intensity distribution characteristic of the light source with respect to all directions.

Japanese Patent Laying-Open No. 2000-258246 discloses a configuration for measuring the total luminous flux, rather than measuring the luminous intensity distribution characteristic itself. In this configuration, it is assumed that a sphere with a radius R has its center at which a light source is located, the spherical surface of this sphere is divided along a plurality of longitudes, a resultant divisional surface defined by one of the longitudes and its adjacent longitude is further divided by a plurality of latitudes to thereby define divisional surface spaces. Photodetectors are arranged in these divisional surface spaces, respectively. Then, the light source is rotated relatively to measure the total luminous flux of the light source.

Japanese Patent Laying-Open Nos. 62-250325, 07-294328, and 2003-247888 each disclose a configuration for measuring the luminous intensity distribution characteristic through a mirror provided at a position where the luminous intensity from a light source is to be measured, in contrast to the above-described configuration for measuring the total luminous flux.

The configurations and the methods disclosed in the above-referenced prior art documents have problems such as a problem of low versatility due to restriction of the type and/or size of the light source that can be measured and/or restriction of the photometric distance, and a problem of complication and increased size of the apparatus.

SUMMARY OF THE INVENTION

An object of the present invention is to provide a new light source support apparatus directed to measurement of the optical radiation characteristic that is different from the configurations and methods disclosed in the above-referenced prior art documents, as well as an optical radiation characteristic measurement apparatus using the light source support apparatus.

A light source support apparatus according to an aspect of the present invention includes: a base member; a first support member supporting the base member rotatably about a first axis; first and second arm members connected respectively to opposite ends of the base member and extending in a direction parallel to the first axis; and a pair of second support members disposed at respective positions, which are opposite to each other, of the first and second arm members for supporting a sample light source. The pair of second support members is configured to be able to rotate the supported sample light source about a second axis orthogonal to the first axis. At least one of the first and second arm members is configured to be attachable to and detachable from the base member.

Preferably, the first support member is configured to be able to fix the base member in a state where a longitudinal direction of the base member is parallel to the second axis.

Preferably, the first support member is configured to be able to fix the base member in a state where a longitudinal direction of the base member is parallel to a third axis orthogonal to both the first and second axes.

Preferably, the base member includes a slide mechanism capable of increasing and decreasing a distance between the first arm member and the second arm member.

Preferably, the pair of second support members is configured to be able to supply electric power to the supported sample light source.

An optical radiation characteristic measurement apparatus according to another aspect of the present invention includes: a light source support member on which a sample light source is mounted; and an optical receiver receiving light from the sample light source. The light source support member includes: a base member; a first support member supporting the base member rotatably about a first axis; first and second arm members connected respectively to opposite ends of the base member and extending in a direction parallel to the first axis; and a pair of second support members disposed at respective positions, which are opposite to each other, of the first and second arm members for supporting a sample light source. The pair of second support members is configured to be able to rotate the supported sample light source about a second axis orthogonal to the first axis. At least one of the first and second arm members is configured to be attachable to and detachable from the base member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
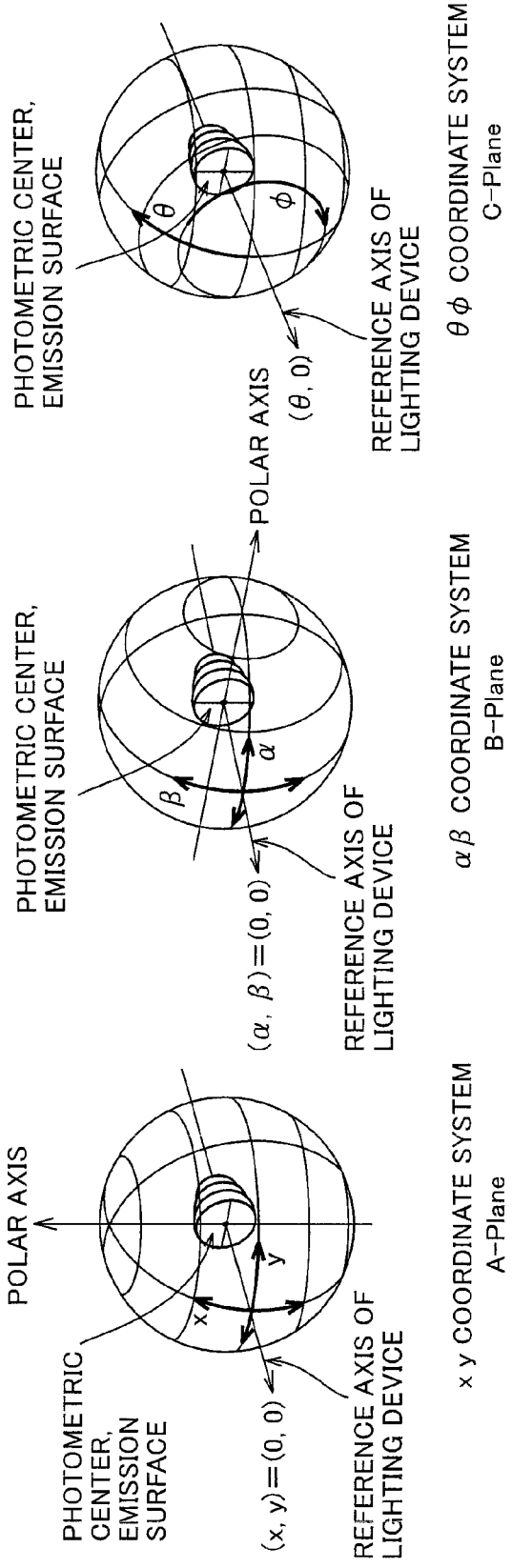
FIG. 1 is a diagram for illustrating spatial coordinate systems for measurement of the luminous intensity distribution characteristic.

An embodiment of the present invention will be described in detail with reference to the drawings. In the drawings, the same or corresponding components are denoted by the same reference characters, and a description thereof will not be repeated.

<A. Measurement of Optical Radiation Characteristic>

An optical radiation characteristic measurement apparatus (hereinafter also referred to simply as "measurement apparatus") according to the present embodiment obtains a spatial distribution of the luminous intensity of a light source by measuring respective luminous intensities at a plurality of positions in a predetermined spatial coordinate system centered at the light source. In the following, a description will be given of an example where the luminous intensity distribution characteristic of a variety of light sources is measured, as a typical example of optical radiation characteristics.

First of all, measurement of the luminous intensity distribution characteristic as well as spatial coordinate systems used for this measurement will be described. FIG. 1 is a diagram for illustrating the spatial coordinate systems for measurement of the luminous intensity distribution characteristic.

As a standard relevant to measurement of the luminous intensity distribution characteristic, the Japanese Industrial Standards specify JIS C8105-5: 2011 "Lighting Device—Part V: Method for Measuring Luminous Intensity Distribution." The Commission Internationale de l'Eclairage (CIE) also specifies CIE 121-SP1:2009 "The Photometry and Goniophotometry of Luminaires—Supplement 1: Luminaires for Emergency Lighting." Both these standards define three different spatial coordinate systems for measurement of the luminous intensity distribution characteristic.

More specifically, as shown in FIG. 1, an xy coordinate system (referred to as A-Plane in the CIE standard), an $\alpha\beta$ coordinate system (referred to as B-Plane in the CIE standard), and a $\theta\phi$ coordinate system (referred to as C-Plane in the CIE standard) are defined. In any of these spatial coordinate systems, each position on the spatial coordinate system is defined with respect to a reference axis of a sample light source (lighting device to be measured) that is orthogonal to an emission surface of the lighting device and passes through the center of emission of the lighting device.

Regarding the xy coordinate system (A-Plane), the polar axis is defined as being in the vertical direction orthogonal to the reference axis of the lighting device, an angle formed by the reference axis and the polar axis on the coordinate system is defined as x, and an angle formed by the reference axis and a third axis orthogonal to both the reference axis and the polar axis on the coordinate system is defined as y. Then, each position on the spatial coordinate system is defined by means of these angles x and y.

Regarding the $\alpha\beta$ coordinate system (B-Plane), the polar axis is defined as being in the horizontal direction orthogonal to the reference axis of the lighting device, an angle formed by the reference axis and the polar axis on the coordinate system is defined as $\alpha$, and an angle formed by the reference axis and a third axis orthogonal to both the reference axis and the polar axis on the coordinate system is defined as $\beta$. Then, each position on the spatial coordinate system is defined by means of these angles $\alpha$ and $\beta$. Namely, the xy coordinate system (A-Plane) and the $\alpha\beta$ coordinate system (B-Plane) differ from each other only in the direction defined as the direction of the polar axis.

Regarding the $\theta\phi$ coordinate system (C-Plane), the polar axis is defined as being in the same direction as the reference axis of the lighting device, an angle relative to the reference axis (polar axis) is defined as $\theta$, and an angle centered at the reference axis (polar axis) is defined as $\phi$. Then, each position on the spatial coordinate system is defined by means of these angles $\theta$ and $\phi$.

As shown in FIG. 1, in regard to any of the spatial coordinate systems, each position on the coordinate system is defined relative to the emission surface and the center of emission of a sample light source (lighting device to be measured). Therefore, from a luminous intensity distribution characteristic measured under any one of the spatial coordinate systems, a luminous intensity distribution characteristic defined under another spatial coordinate system can also be derived. Specifically, the conversion formulas as indicated below can be used to derive, from the luminous intensity distribution characteristic under a certain spatial coordinate system, the luminous intensity distribution characteristic under another spatial coordinate system.

| | converted to | | |
|---|---|---|---|
| converted from | $\theta\phi$ coordinate system | xy coordinate system | $\alpha\beta$ coordinate system (HV coordinate system) |
| $\theta\phi$ coordinate system | — | $x = \sin^{-1}(\sin\phi \cdot \sin\theta)$ $y = \tan^{-1}(\cos\phi \cdot \tan\theta)$ | $\alpha = \sin^{-1}(\cos\phi \cdot \sin\theta)$ $\beta = \tan^{-1}(\sin\phi \cdot \tan\theta)$ |
| xy coordinate system | $\theta = \cos^{-1}(\cos y \cdot \cos x)$ $\phi = \tan^{-1}(\tan x/\sin y)$ | — | $\alpha = \sin^{-1}(\sin y \cdot \cos x)$ $\beta = \tan^{-1}(\tan x/\cos y)$ |
| $\alpha\beta$ coordinate | $\theta = \cos^{-1}(\cos\alpha \cdot \cos\beta)$ | $x = \sin^{-1}(\sin\beta \cdot \cos\alpha)$ | — |

-continued

| | converted to | | |
|---|---|---|---|
| converted from | θφ coordinate system | xy coordinate system | αβ coordinate system (HV coordinate system) |
| system (HV coordinate system) | φ = tan⁻¹(−sin β/tan α) | y = tan⁻¹(tan α/cos β) | |

Thus, as long as the luminous intensity distribution characteristic has been measured under any one of the spatial coordinate systems shown in FIG. 1, the luminous intensity characteristic under another spatial coordinate system, if required, can be obtained by converting the measured luminous intensity distribution characteristic in accordance with the conversion formulas.

<B. Overall Configuration>

Figure 2:
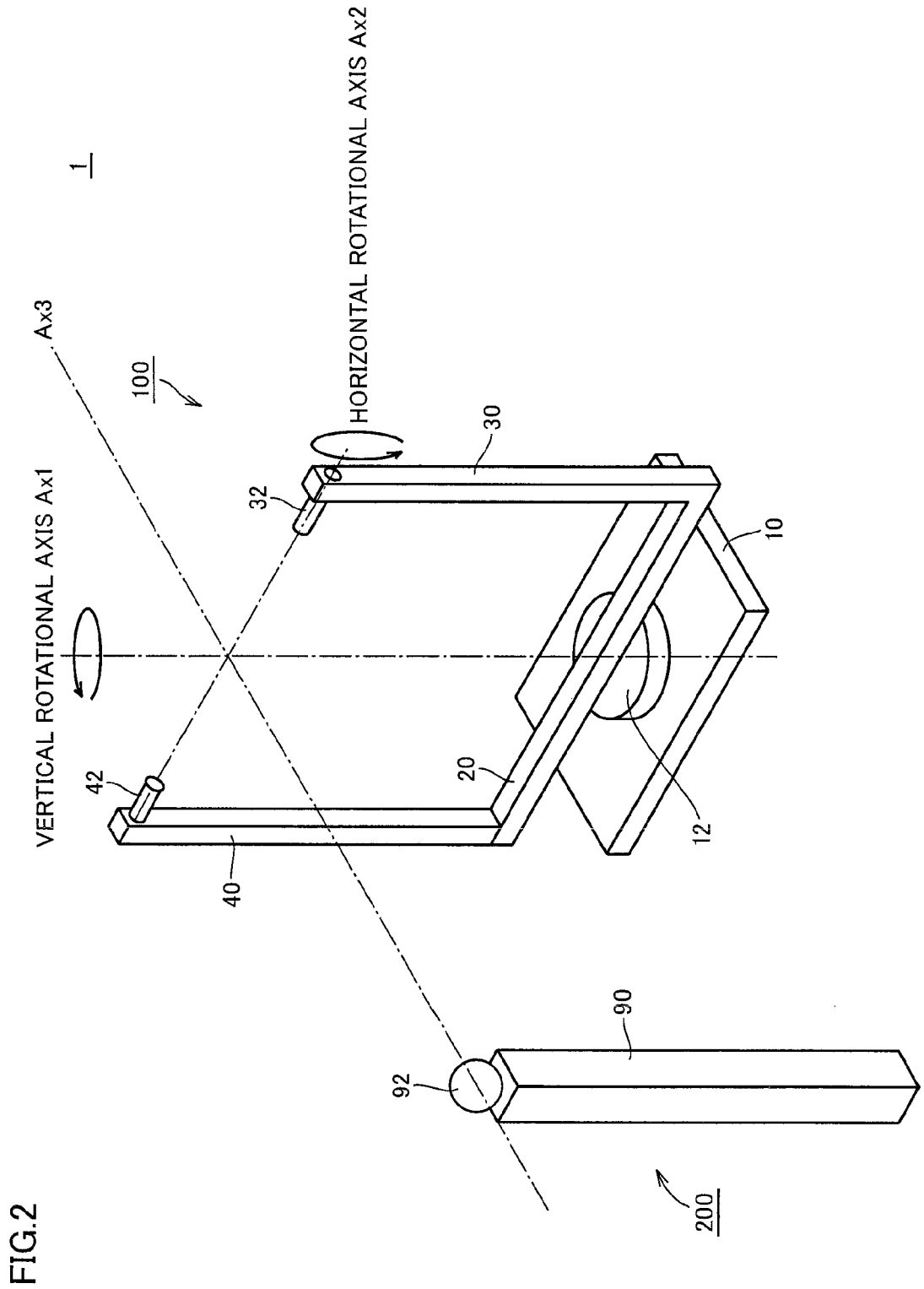
FIG. 2 is a perspective view showing an overall configuration of an optical radiation characteristic measurement apparatus according to an embodiment of the present invention.

Next, an overall configuration of the measurement apparatus according to the present embodiment will be described. FIG. 2 is a perspective view showing the overall configuration of optical radiation characteristic measurement apparatus 1 according to the present embodiment. Referring to FIG. 2, measurement apparatus 1 includes a light source support apparatus 100 and an optical receiver 200. A processing apparatus for processing the result of detection performed by optical receiver 200 may further be provided as described later herein.

In measurement apparatus 1, a light source whose luminous intensity distribution characteristic is to be measured (hereinafter also referred to as "sample light source") is mounted on light source support apparatus 100, and the sample light source mounted on light source support apparatus 100 is further rotated step by step each time by a predetermined angle about a predetermined rotational axis, to thereby change, step by step, the relative positional relationship between the sample light source and optical receiver 200. In this way, the relative positional relationship is changed step by step to thereby measure the spatial distribution of the luminous intensity of the light source.

The type of the sample light source is not limited, and light source support apparatus 100 is applicable to a variety of light sources such as incandescent bulb, fluorescent lamp, LED (Light Emitting Device), and organic EL (Electro Luminescence). Specifically, light source support apparatus 100 is applicable not only to rodlike light sources such as straight-tube type fluorescent lamp but also spherical light sources such as incandescent bulb, fluorescent bulb, and LED bulb. A description of this will be given later herein. In addition, a surface light source such as LED or organic EL may also be the sample light source.

Referring to FIG. 2, light source support apparatus 100 includes a base member 20, a fixed arm member 30 formed integrally with base member 20, and a detachable arm member 40 which is attachable to and detachable from base member 20. These members are mounted rotatably about a vertical rotational axis Ax1 through a rotational support member 12 disposed on a support stage 10. Namely, light source support apparatus 100 includes rotational support member 12 which supports base member 20 so that base member 20 is rotatable about vertical rotational axis Ax1 which is a first axis.

Fixed arm member 30 and detachable arm member 40 have respective top ends at which fixture jigs 32 and 42 are disposed respectively for rotatably supporting the sample light source. Both fixture jigs 32 and 42 or fixture jig 32 disposed at fixed arm member 30 is used to fix the sample light source.

As described later herein, fixture jigs 32 and 42 also serve as lighting jigs, and supply electric power for lighting the sample light source during measurement of the luminous intensity distribution characteristic.

Thus, light source support apparatus 100 includes fixed arm member 30 and detachable arm member 40 connected respectively to the opposite ends of base member 20 and extending in the direction parallel to vertical rotational axis Ax1 which is the first axis. Light source support apparatus 100 further includes fixture jigs 32 and 42 which are a pair of support members disposed at respective positions, which are opposite to each other, of fixed arm member 30 and detachable arm member 40 for supporting the sample light source. Fixture jigs 32 and 42 are configured to be able to rotate the supported sample light source about a horizontal rotational axis Ax2 orthogonal to vertical rotational axis Ax1.

In light source support apparatus 100 according to the present embodiment, at least detachable arm member 40 is attachable to and detachable from base member 20. Accordingly, when a rodlike sample light source such as straight-tube type fluorescent lamp is to be measured, both fixed arm member 30 and detachable arm member 40 support the sample light source and, when a spherical sample light source is to be measured, only fixed arm member 30 supports the sample light source. Then, base member 20 can be rotated about vertical rotational axis Ax1 to optimize the relative positional relationship between the sample light source and optical receiver 200.

Fixed arm member 30 may also be configured to be attachable to and detachable from base member 20. In this case, one of the arm members that is unnecessary is detached when measurements are to be taken. Both the arm members may be configured to be detachable so that light source support apparatus 100 is made compact for storage when not in use.

Optical receiver 200 includes a support stage 90 and an optical receiving unit 92 arranged on support stage 90. Support stage 90 has its height adjusted so that optical receiving unit 92 is located on a reference axis Ax3 of the sample light source.

Optical receiving unit 92 detects the luminous intensity of light emitted from the sample light source. As optical receiving unit 92, a device such as photodiode that detects the intensity of light may be employed, or a spectroscopic detector for detecting the intensity (spectrum) at each wavelength may be employed. Moreover, optical receiving unit 92 includes components such as a lens system for concentrating the light.

The result of detection performed by optical receiving unit 92 is stored one by one in such a manner that the result is associated with information indicating a corresponding relative position. By this association of the detected value with each coordinate value of the spatial coordinate system, the luminous intensity distribution characteristic is measured. An apparatus for processing the result of detection performed by optical receiving unit 92 will be described later herein.

<C. Preparation for Measurement and Measuring Operation>

Next, with reference to FIGS. 3 to 9, a description will be given of preparation for measurement and a measuring operation that are performed when the luminous intensity distribution characteristic is to be obtained by means of measurement apparatus 1 according to the present embodiment. The description will be given regarding each of measurement of the luminous intensity distribution characteristic of a straight-tube type fluorescent lamp (sample light source SMP1) and that of a spherical light source (sample light source SMP2).

FIGS. 3 to 9 are each a diagram for illustrating preparation for measurement and a measuring operation using optical radiation characteristic measurement apparatus 1 according to the present embodiment.

<<c1: Sample Light Source SMP1 (Measurement with B-Plane)>>

First, referring to FIGS. 3 and 4, a procedure for measuring sample light source SMP1 will be described. In measurement apparatus 1, sample light source SMP1 which is a rodlike light source is measured with the $\alpha\beta$ coordinate system (B-Plane) shown in FIG. 1. Specifically, base member 20 is rotated about vertical rotational axis Ax1 to change angle $\alpha$, and sample light source SMP1 is rotated about horizontal rotational axis Ax2 to change angle $\beta$.

Figure 3:
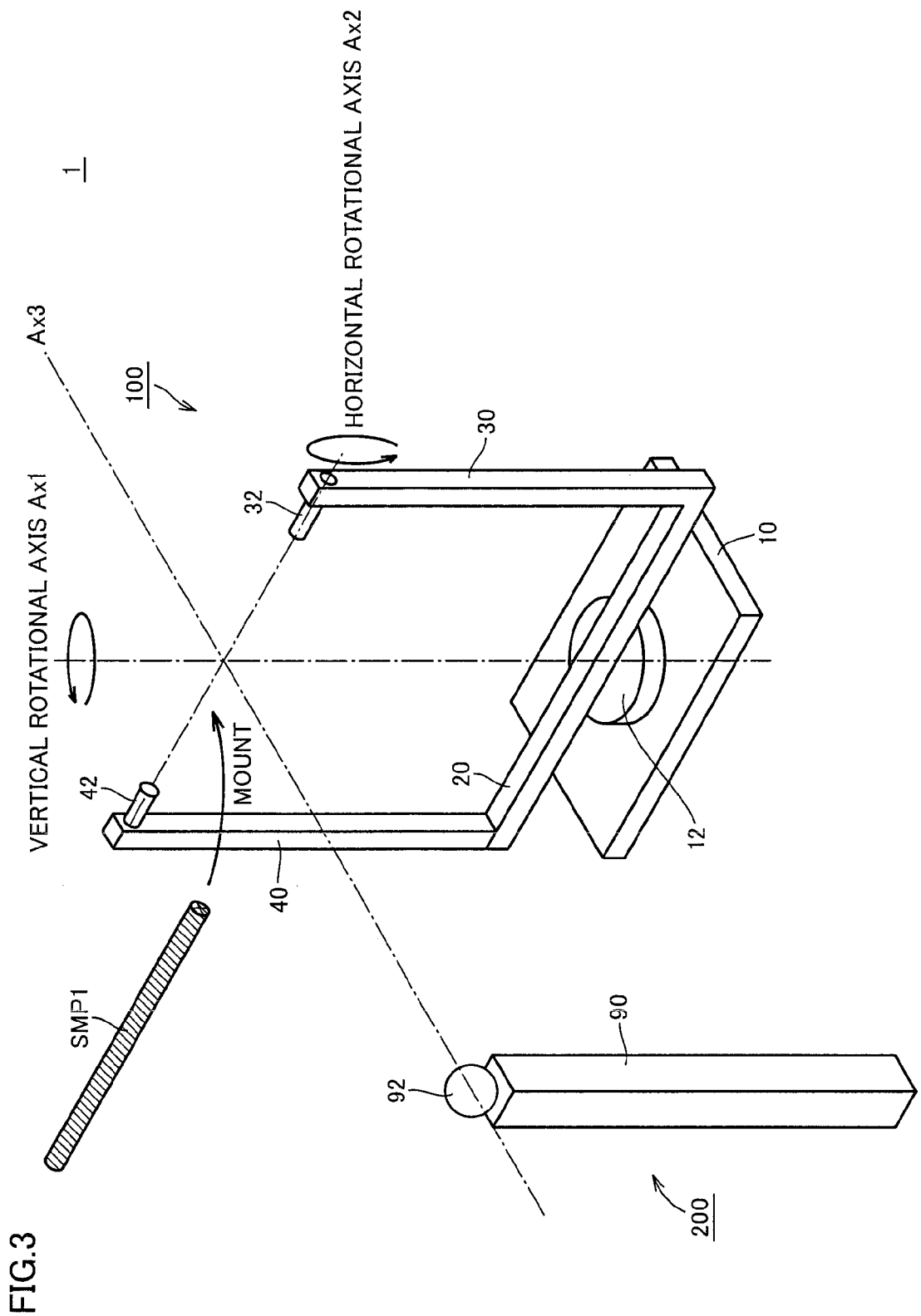
FIGS. 3 to 9 are each a diagram for illustrating preparation for measurement and a measuring operation by means of the optical radiation characteristic measurement apparatus according to the present embodiment.

As shown in FIG. 3, when sample light source SMP1 is to be measured, sample light source SMP1 is first mounted between fixture jig 32 and fixture jig 42 with detachable arm member 40 mounted on base member 20. Then, sample light source SMP1 is powered to become a lighting state. At this time, optical receiving unit 92 arranged on support stage 90 is positioned on reference axis Ax3 which is orthogonal to both vertical rotational axis Ax1 and horizontal rotational axis Ax2.

Figure 4:
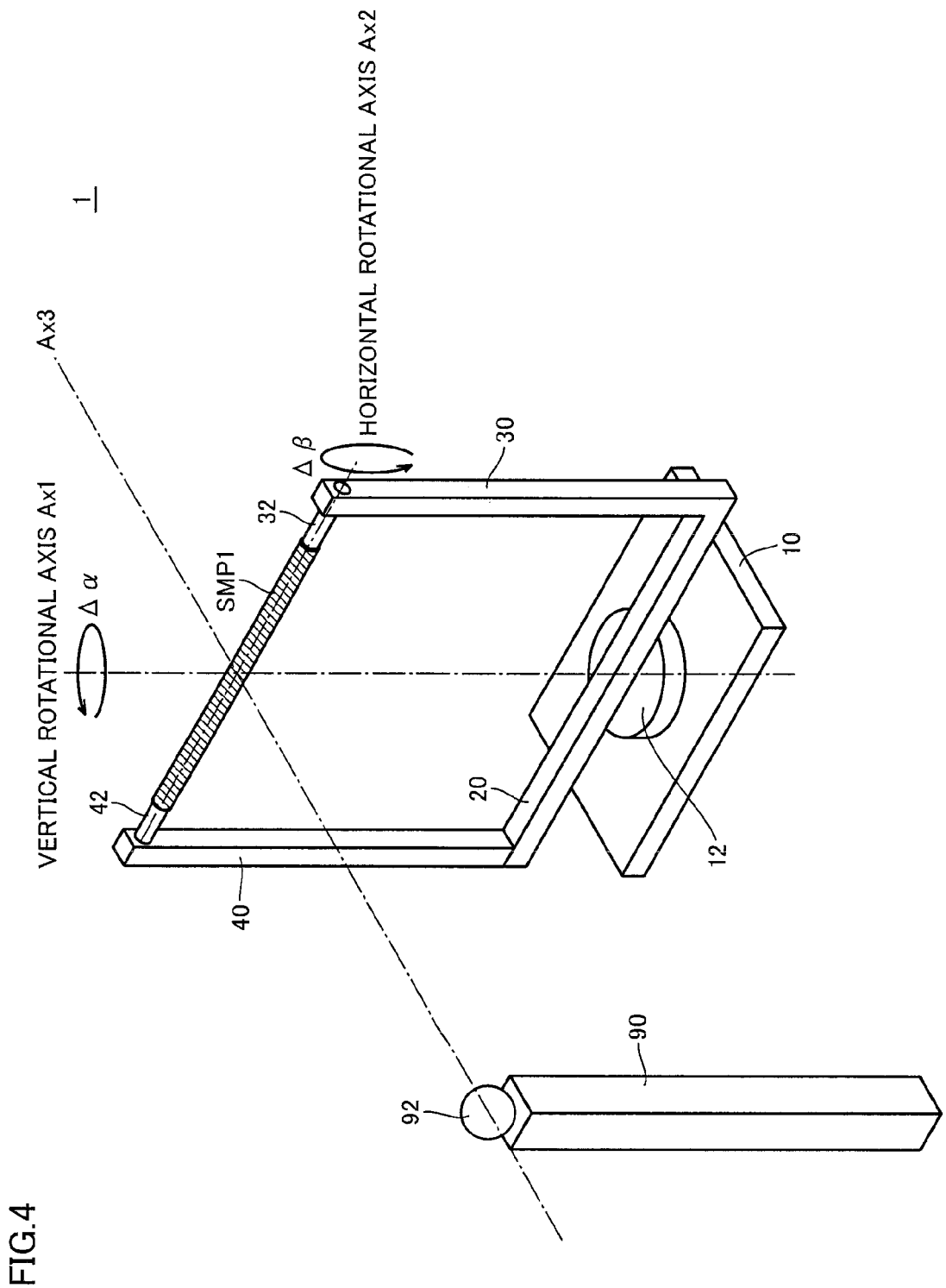

Subsequently, as shown in FIG. 4, sample light source SMP1 is rotated in a predetermined order about vertical rotational axis Ax1 and horizontal rotational axis Ax2 by $\Delta\alpha$ and $\Delta\beta$ respectively, and the result of detection performed by optical receiving unit 92 for each rotational position is recorded.

When measurement with respect to all relative positional relationships has been completed, the luminous intensity distribution characteristic (B-Plane) is output. It should be noted that the luminous intensity distribution characteristic defined by means of another coordinate system may also be derived as required.

As shown in FIGS. 3 and 4, it is necessary, for measuring sample light source SMP1 which is a rodlike light source, that the longitudinal direction of sample light source SMP1 is identical (parallel) to an axis which is orthogonal to both vertical rotational axis Ax1 and reference axis Ax3. It is therefore preferable that rotational support member 12 can fix base member 20 in the state where the longitudinal direction of base member 20 is parallel to horizontal rotational axis Ax2.

<<c2: Sample Light Source SMP2 (Measurement with C-Plane)>>

Referring next to FIGS. 5 to 9, a procedure for measuring sample light source SMP2 will be described. In measurement apparatus 1, spherical sample light source SMP2 is measured with the $\theta\phi$ coordinate system (C-Plane) shown in FIG. 1. Specifically, base member 20 is rotated about vertical rotational axis Ax1 to change angle $\theta$, and sample light source SMP2 is rotated about horizontal rotational axis Ax2 to change angle $\phi$.

Figure 5:
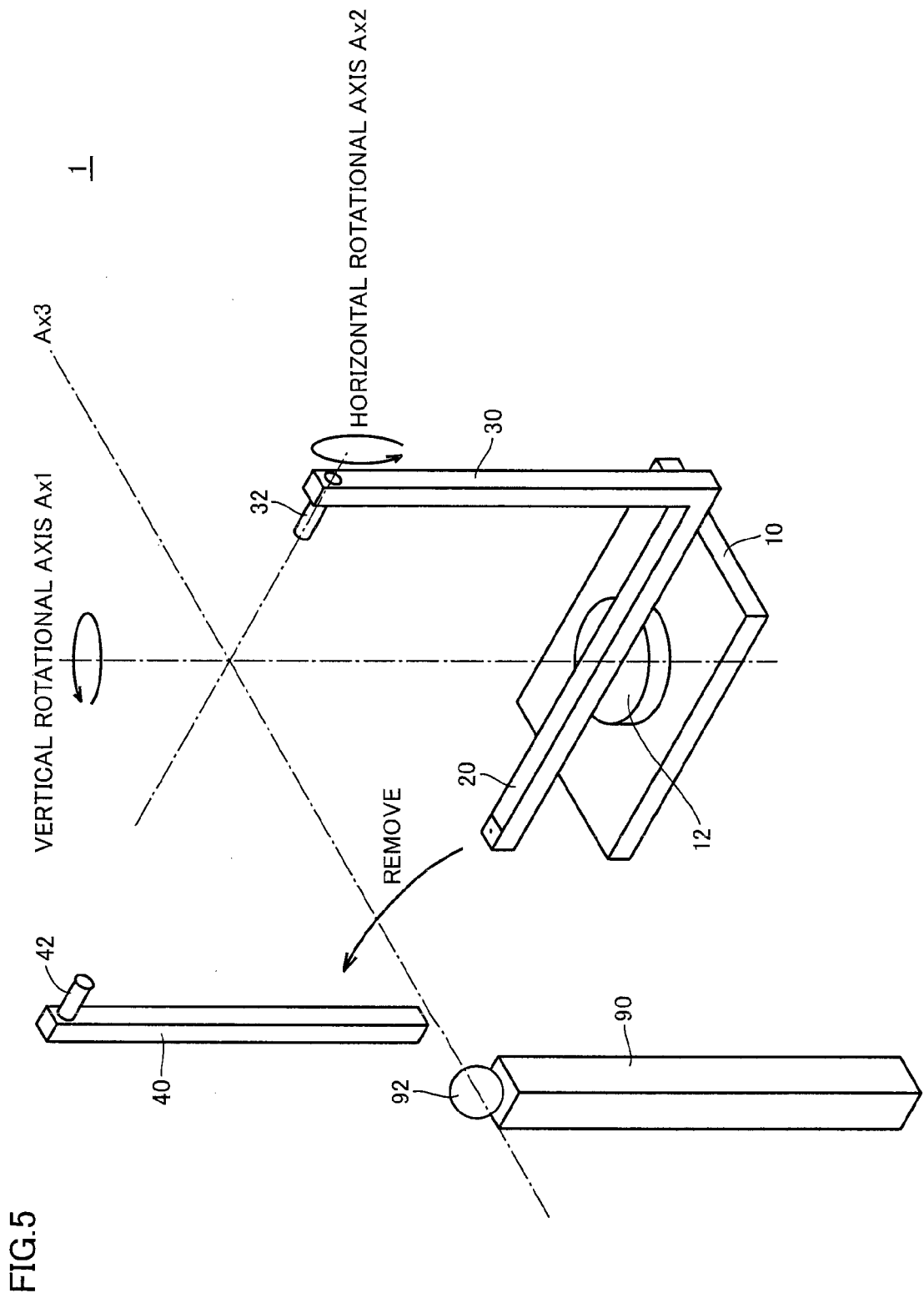
Figure 6:
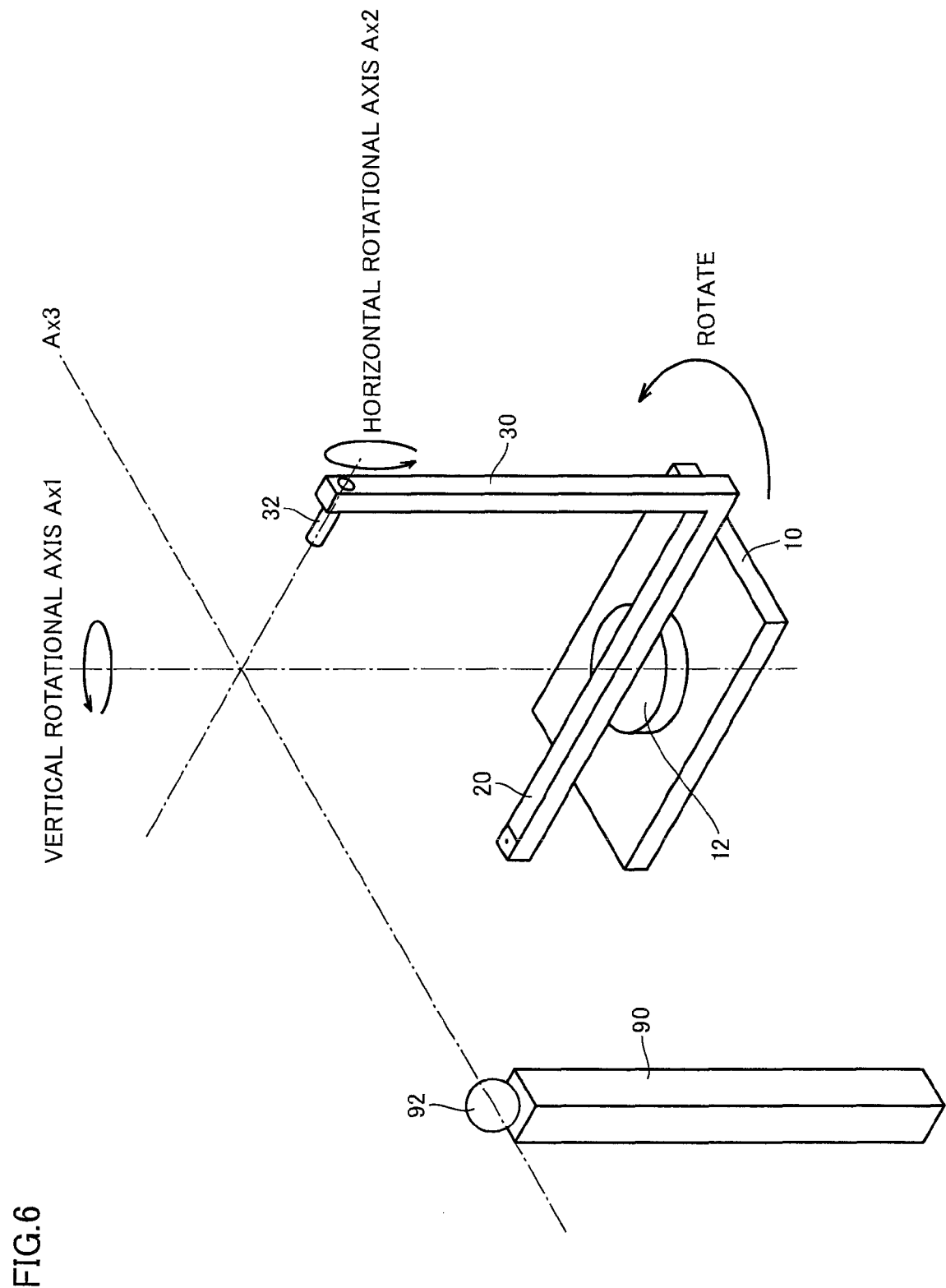
Figure 7:
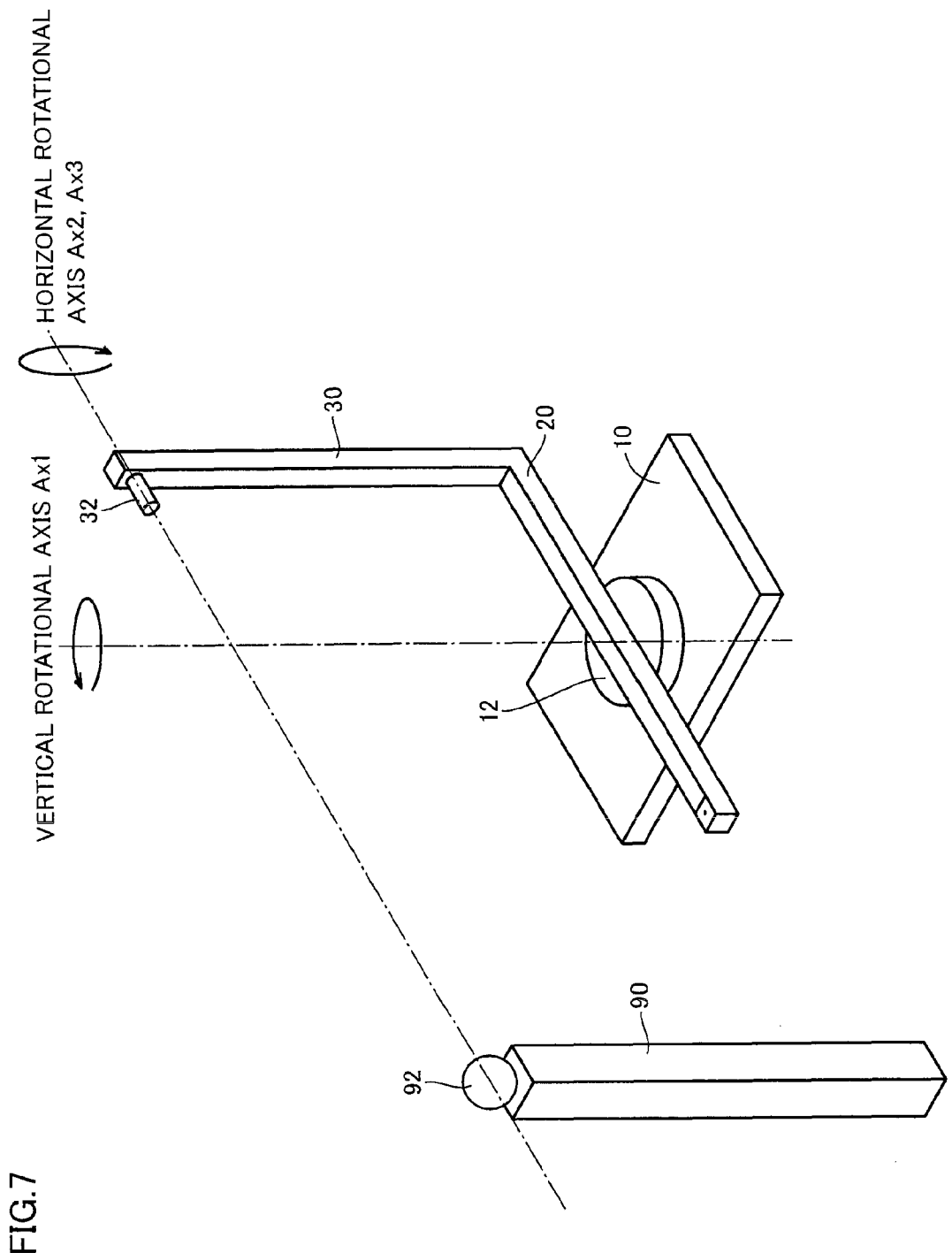

As shown in FIG. 5, when sample light source SMP2 is to be measured, detachable arm member 40 is first removed from base member 20. Then, as shown in FIGS. 6 and 7, base member 20 is rotated about vertical rotational axis Ax1 with detachable arm member 40 removed from base member 20. Namely, base member 20 is arranged so that horizontal rotational axis Ax2 is identical (parallel) to reference axis Ax3 of the sample light source.

Figure 8:
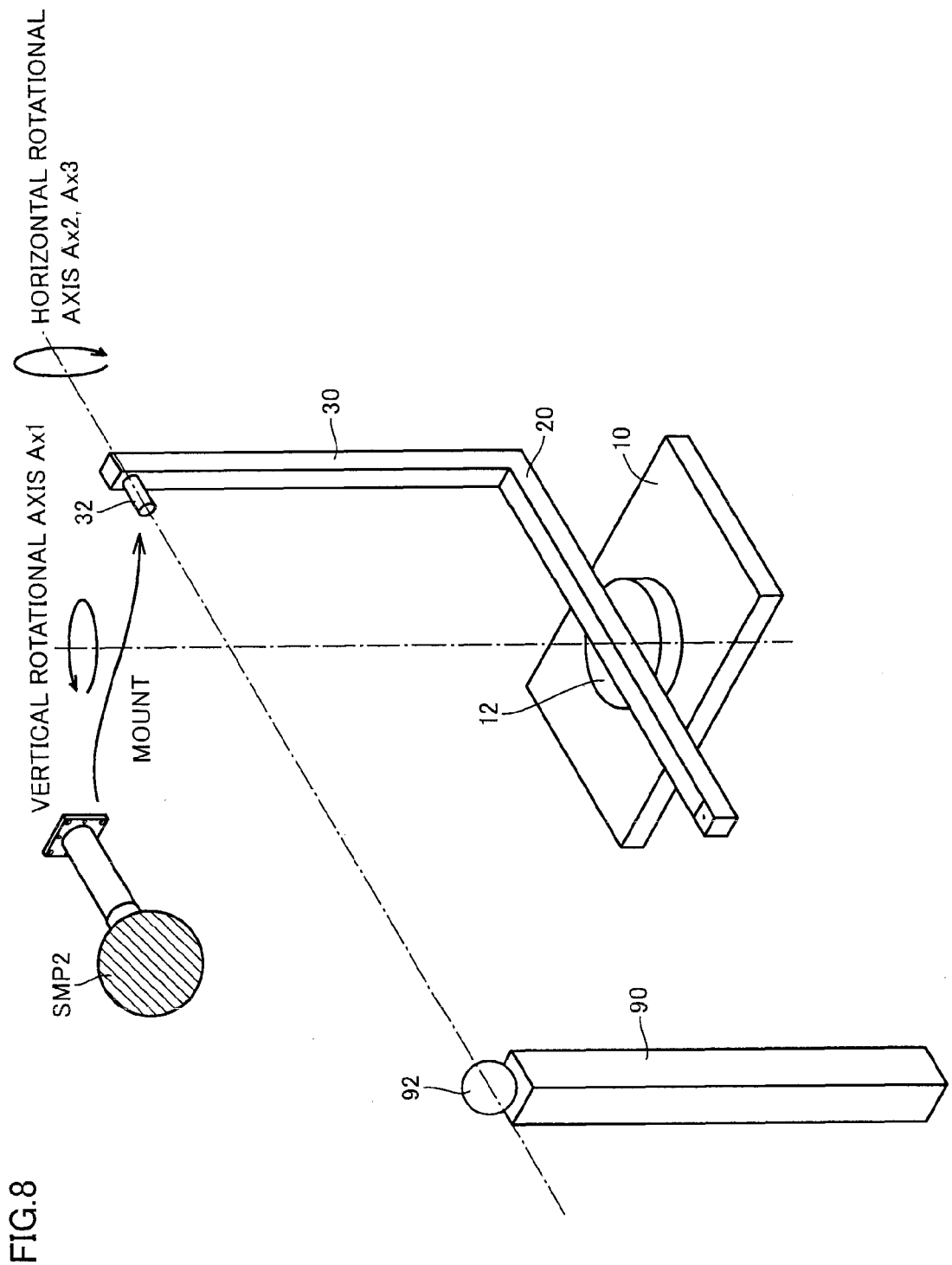

Subsequently, as shown in FIG. 8, sample light source SMP2 is mounted on fixture jig 32. Then, sample light source SMP2 is powered to become a lighting state. At this time, optical receiving unit 92 arranged on support stage 90 is positioned on reference axis Ax3 (identical to horizontal rotational axis Ax2) which is orthogonal to vertical rotational axis Ax1.

Figure 9:
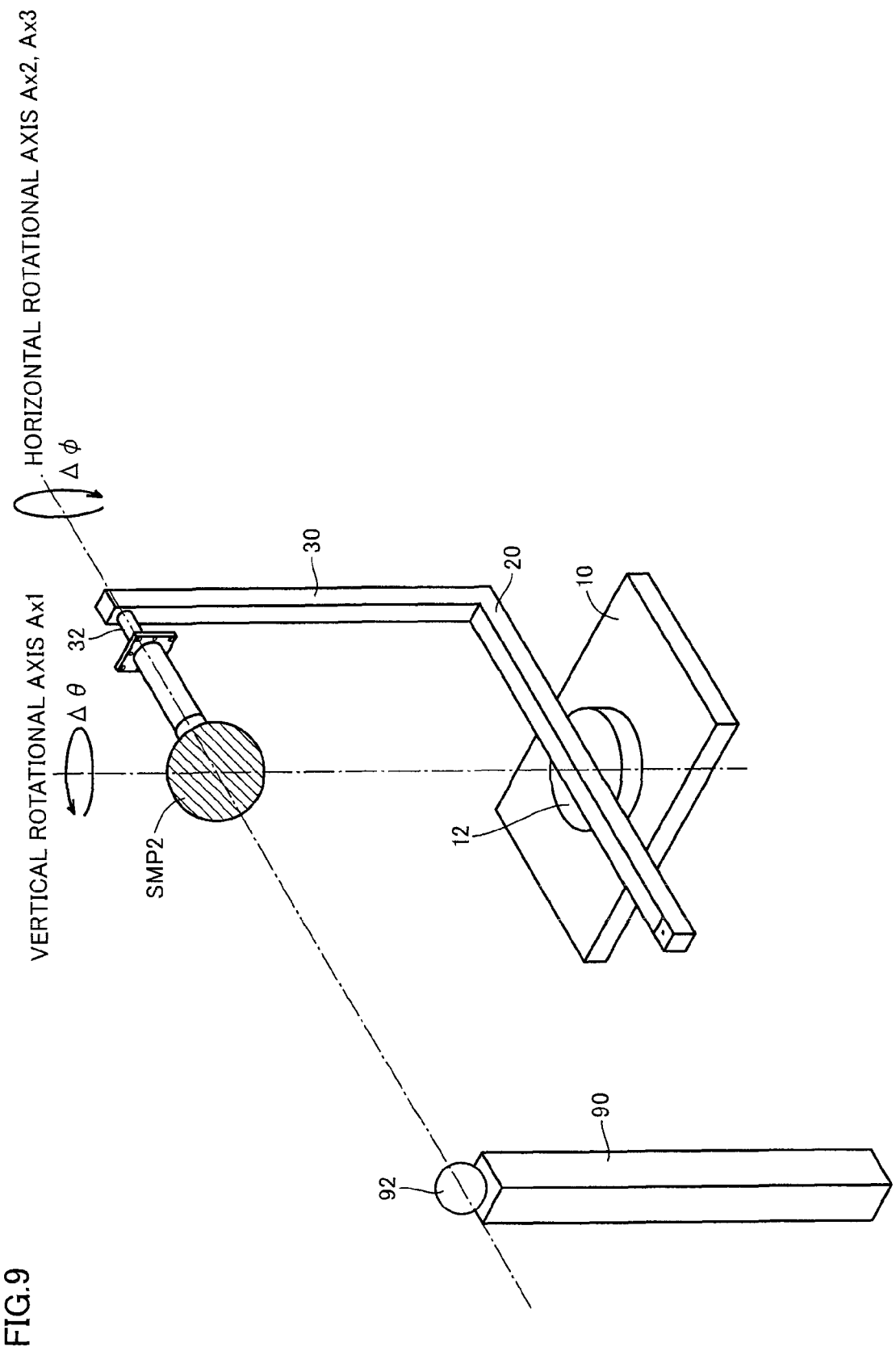

Further, as shown in FIG. 9, sample light source SMP2 is rotated in a predetermined order about vertical rotational axis Ax1 and horizontal rotational axis Ax2 by $\Delta\theta$ and $\Delta\phi$ respectively, and the result of detection performed by optical receiving unit 92 is recorded for each rotational position.

When measurement with respect to all relative positional relationships has been completed, the luminous intensity distribution characteristic (C-Plane) is output. It should be noted that the luminous intensity distribution characteristic defined by means of another coordinate system may also be derived as required.

As shown in FIG. 9, it is necessary for measuring spherical sample light source SMP2 that horizontal rotational axis Ax2 is identical (parallel) to reference axis Ax3. It is therefore preferable that rotational support member 12 can fix base member 20 in the state where the longitudinal direction of base member 20 is parallel to reference axis Ax3 (axis orthogonal to vertical rotational axis Ax1).

<D. Photometric Distance>

According to the above-referenced JIS C8105-5: 2011, the photometric distance (distance from a sample light source to optical receiving unit 92) during measurement of the luminous intensity distribution characteristic should be constant, and this photometric distance is desirably at least five times as long as the maximum dimension of the light emission surface of a sample light source (lighting device). For example, when the luminous intensity distribution characteristic of a fluorescent lamp of 1.2 m is to be measured, the photometric distance is preferably at least 6 m.

It should be noted the requirement that the photometric distance should be five times as long as the maximum dimension of the emission surface has been determined on the assumption that the error of the luminous intensity can be kept at 1% or less even if the divergence of the light beam emitted from the light source is 120%. Therefore, if the sample light source has an optically-converging luminous intensity distribution characteristic, the photometric distance which is five times as long as the maximum dimension of the emission surface is not enough and a still longer photometric distance is necessary.

In measurement apparatus 1 according to the present embodiment, optical receiver 200 can be arranged at the position of any photometric distance as long as it satisfies the condition that optical receiving unit 92 is located on reference axis Ax3 of the sample light source mounted on light source support apparatus 100.

Figure 10:
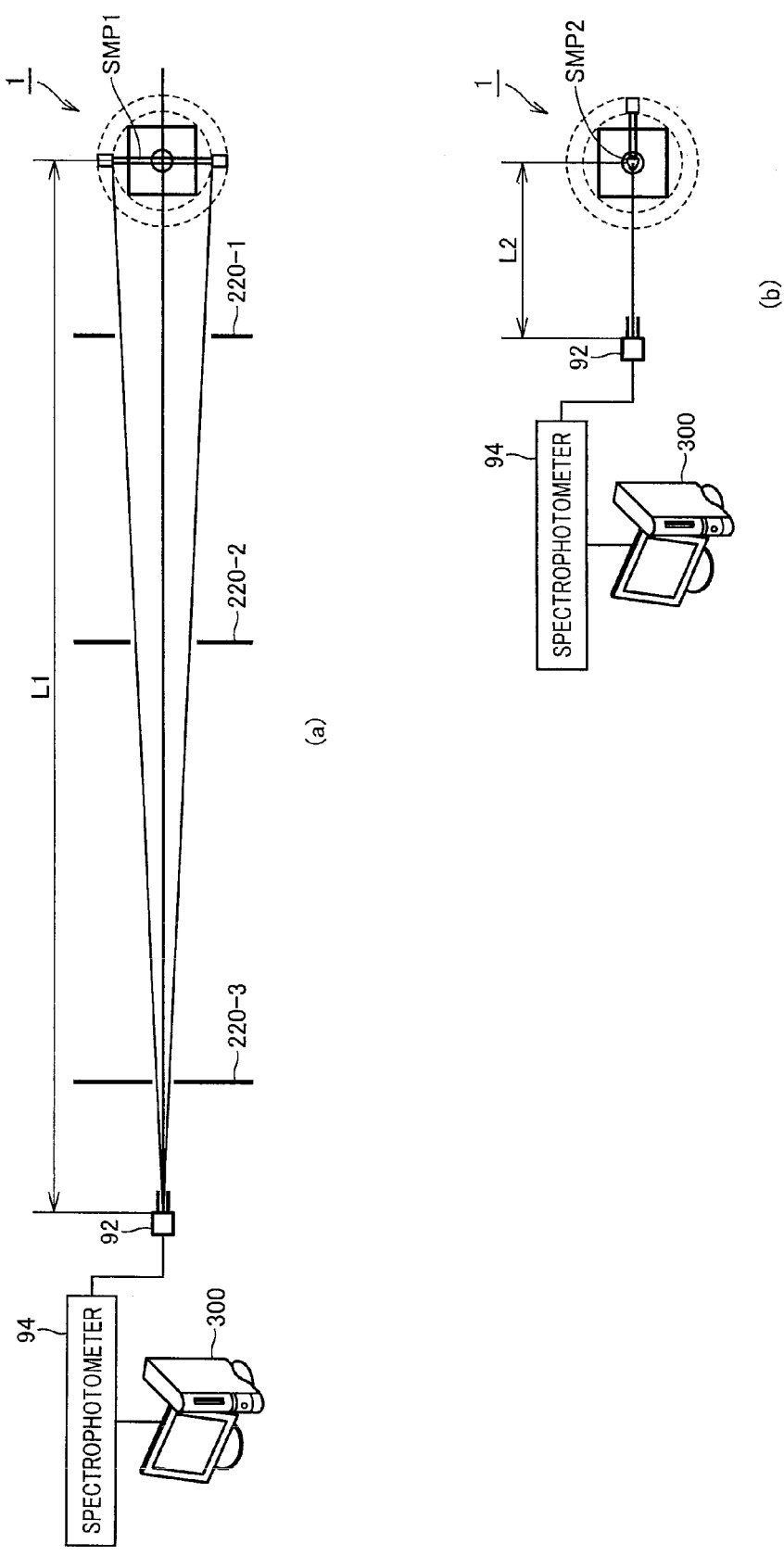
FIGS. 10 and 11 are each is a diagram for illustrating the photometric distance of the optical radiation characteristic measurement apparatus according to the present embodiment.
Figure 11:
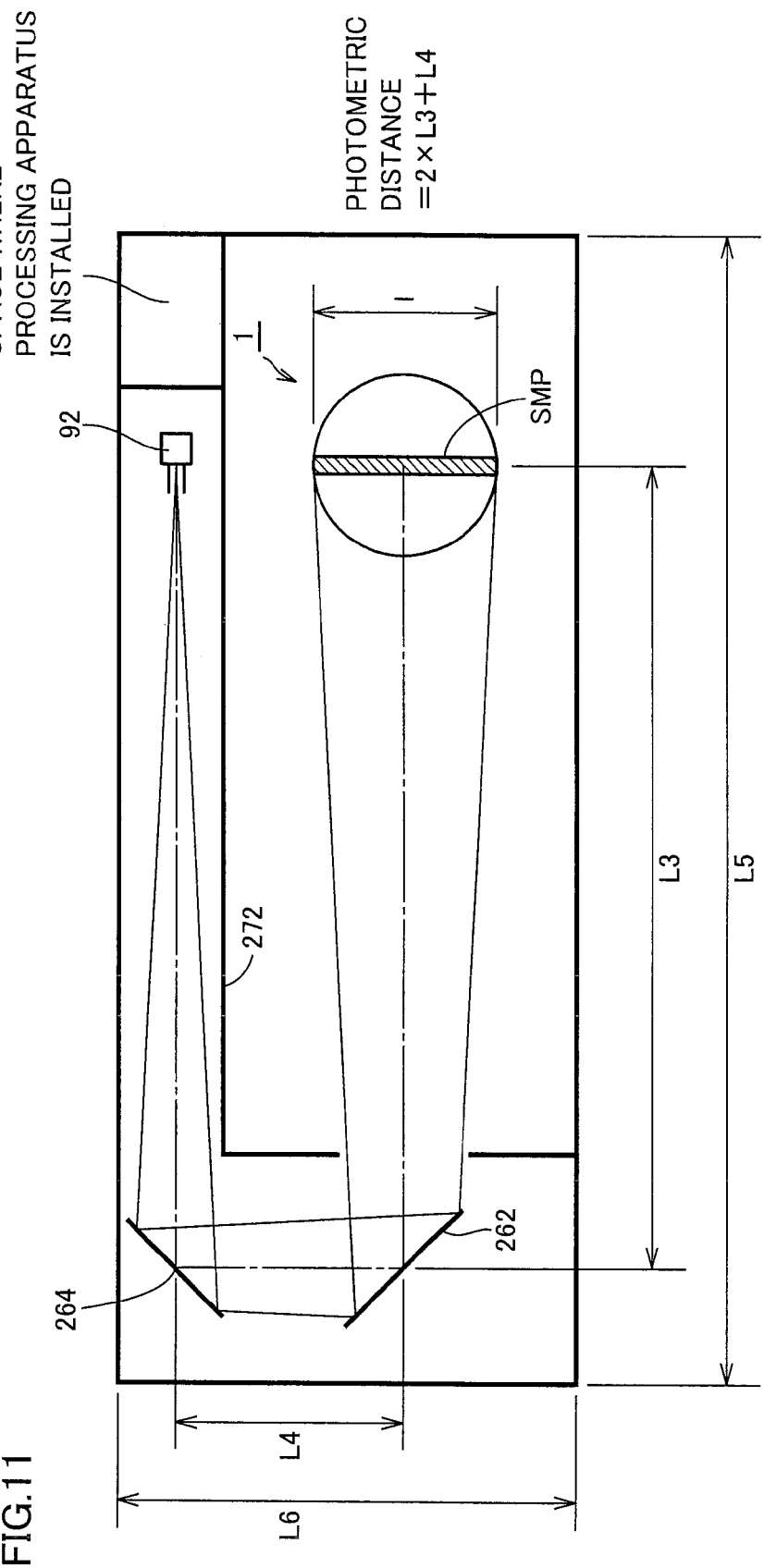

FIGS. 10 and 11 are each a diagram for illustrating the photometric distance of optical radiation characteristic measurement apparatus 1 according to the present embodiment.

Referring to (a) of FIG. 10, when the luminous intensity distribution characteristic of sample light source SMP1 which is a rodlike light source is to be measured, light source support apparatus 100 and optical receiver 200 are arranged so that they are separated from each other by a distance L1 which is at least five times as long as the length of sample light source SMP1. While this distance L1 depends on the length of sample light source SMP1, distance L1 is preferably on the order of 12 m for example.

If the photometric distance between light source support apparatus 100 and optical receiver 200 is longer, a stray light component having been reflected from an essentially unintended portion may be introduced onto the optical path. While the optical system shown in FIG. 10 is arranged in a dark room, the stray light component may still be generated. Such a stray light component may be a factor of the measurement error. It is therefore preferable to provide light shielding plates 220-1, 220-2, 220-3 on the optical path between light source support apparatus 100 and optical receiver 200.

In contrast to the photometric distance for measurement of the luminous intensity distribution characteristic of sample light source SMP1, the photometric distance for measurement of the luminous intensity distribution characteristic of spherical sample light source SMP2 may be shorter. Specifically, as shown in (b) of FIG. 10, light source support apparatus 100 and optical receiver 200 are arranged so that they are separated from each other by a distance L2 shorter than distance L1. While this distance L2 depends on factors such as the diameter of sample light source SMP2, distance L2 is preferably on the order of 2 m for example.

FIG. 10 shows a configuration with which a spectrophotometric luminous intensity of the sample light source can be measured. Specifically, a spectrophotometer 94 is connected to optical receiving unit 92, and the result (spectrum) of detection performed at each coordinate value is output to a processing apparatus 300.

It is supposed that, due to spatial restriction, the photometric distance which is no less than distance L1 (12 m for example) as shown in (a) of FIG. 10 cannot be ensured in many cases. In such cases, as shown in FIG. 11, the installation space may be partitioned by a light shielding plate 272 and mirrors 262 and 264 may be appropriately arranged to ensure the photometric distance. In this example, the installation space is partitioned into three sections, namely an area where measurement apparatus 1 is installed, an area where optical receiving unit 92 (optical receiver 200) is installed, and an area where processing apparatus 300 is installed, and mirrors 262 and 264 are used to change the direction in which the beam from the sample light source is propagated, to thereby enable the photometric distance (2×distance L3+distance L4) to be ensured. For example, if an installation space having one side with a distance L5=15 m and the other side with a distance L6=6 m is available, distance L3=10.5 m and distance L4=3 m can be ensured and accordingly a photometric distance of about 24 m can be ensured. With this photometric distance, the optical radiation characteristic (luminous intensity distribution characteristic) of a sample light source having a diameter 1 on the order of 2.4 m can be measured with sufficiently high accuracy.

<E. Processing Apparatus>

Next, processing apparatus 300 according to the present embodiment will be described.

Figure 12:
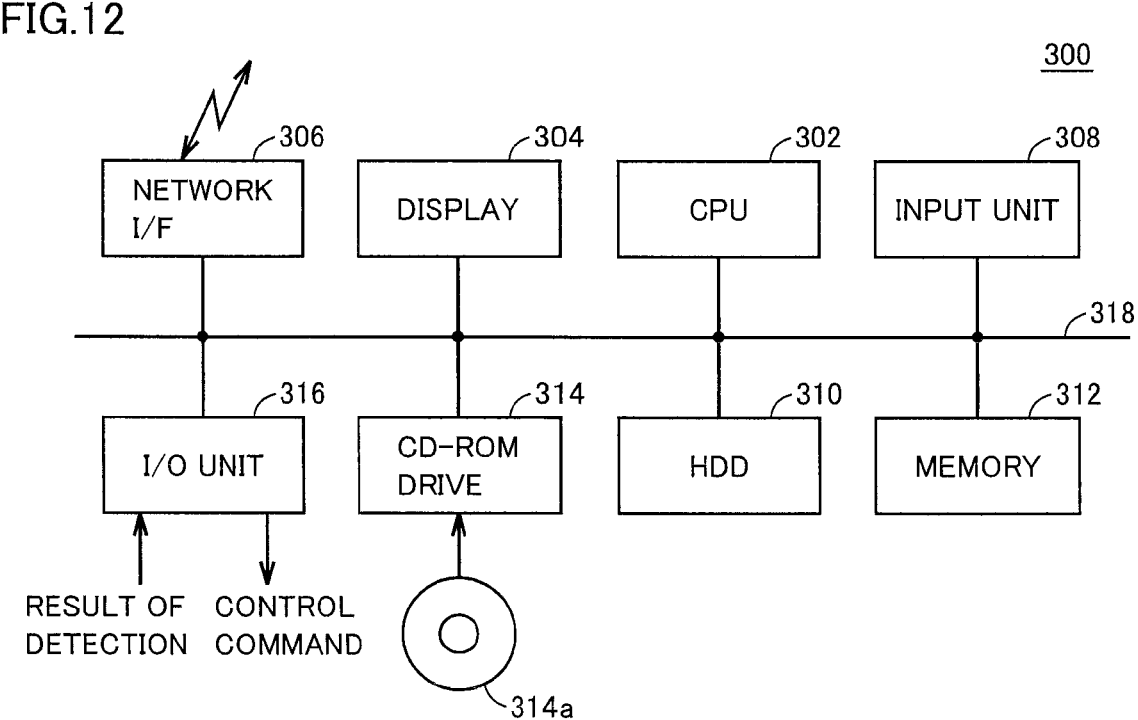
FIG. 12 is a schematic diagram showing a hardware configuration of a processing apparatus according to the present embodiment.

FIG. 12 is a schematic diagram showing a hardware configuration of processing apparatus 300 according to the present embodiment. Referring to FIG. 12, processing apparatus 300 is typically implemented by a computer. Specifically, processing apparatus 300 includes a CPU (Central Processing Unit) 302 executing a variety of programs including an operating system (OS), a memory 312 temporarily storing data which is necessary for CPU 302 to execute the programs, and a hard disk drive (HDD) 310 storing, in a nonvolatile manner, the programs to be executed by CPU 302. Hard disk drive 310 also stores, in advance, a program for implementing the processing as described later herein, and such a program is read by a CD-ROM drive 314 from a CD-ROM (Compact Disk-Read Only Memory) 314a or the like. Alternatively, CPU 302 may receive the program from a server apparatus or the like through a network via a network interface (I/F) 306, and store the program in hard disk drive 310.

CPU 302 receives the result of detection performed by optical receiver 200 through an I/O (Input Output) unit 316, and provides a variety of control commands to light source support apparatus 100.

CPU 302 receives instructions from a user for example through an input unit 308 which is configured by a keyboard, a mouse, and the like, and outputs to a display 304 the luminous intensity distribution characteristic for example that has been calculated through execution of a program.

A part or the whole of functions installed in processing apparatus 300 may be implemented by dedicated hardware.

<F. Electrical Configuration>

Next, an electrical configuration of light source support apparatus 100 according to the present embodiment will be described.

Figure 13:
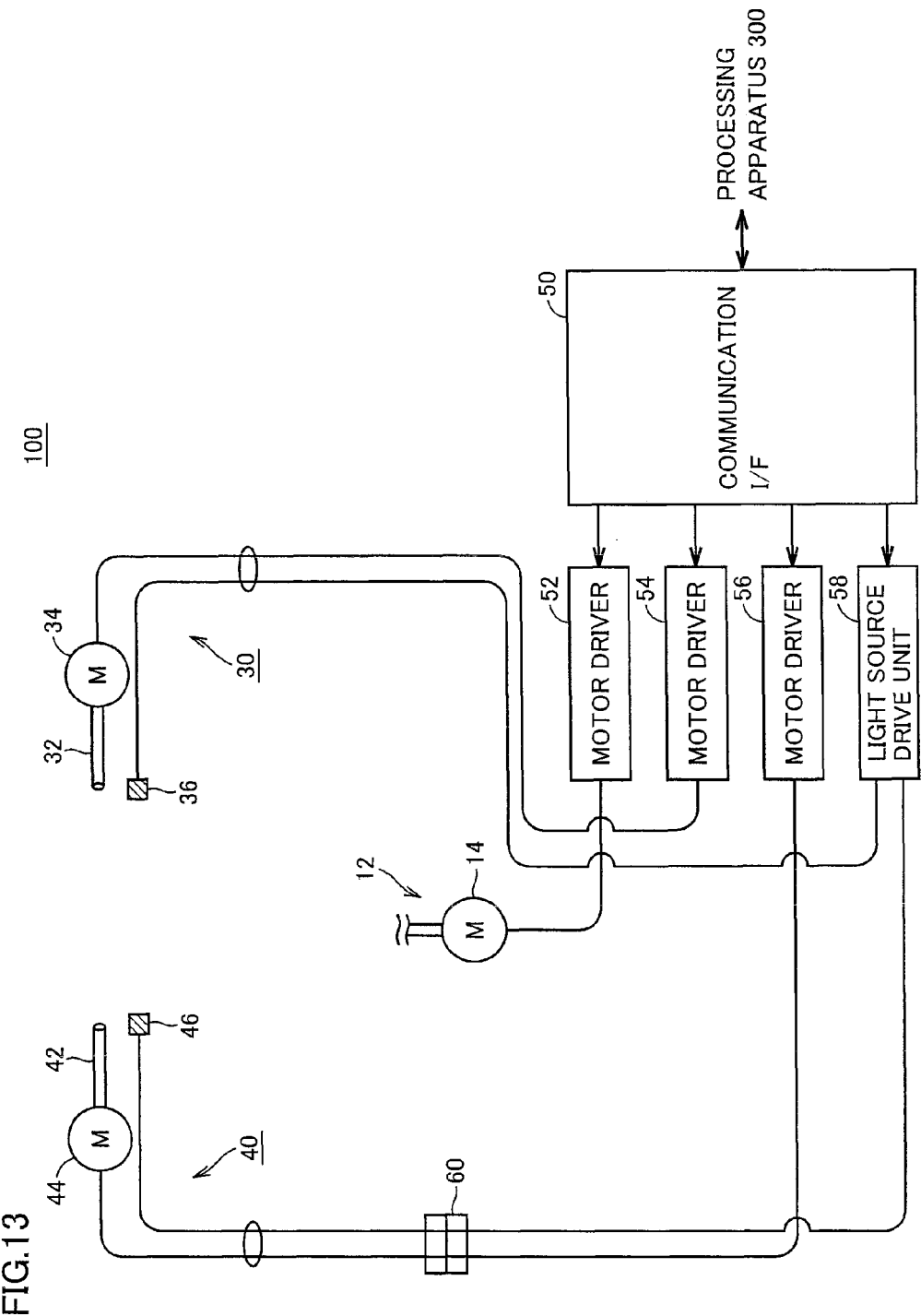
FIG. 13 is a schematic diagram showing an electrical configuration of a light source support apparatus according to the present embodiment.

FIG. 13 is a schematic diagram showing an electrical configuration of light source support apparatus 100 according to the present embodiment. Referring to FIG. 13, light source support apparatus 100 further includes motors 34 and 44 for rotatably driving fixture jigs 32 and 42, respectively, and connectors 36 and 46 electrically connected to a sample light source for supplying electric power to the sample light source. Motor 34 and connector 36 are arranged inside or around fixture jig 32 of fixed arm member 30. Likewise, motor 44 and connector 46 are arranged inside or around fixture jig 42 of detachable arm member 40. A connector 60 for allowing detachable arm member 40 to be attachable to and detachable from base member 20 is provided at the joint therebetween.

Light source support apparatus 100 further includes a motor 14 for rotatably driving base member 20. Motor 14 is arranged inside rotational support member 12.

Motors 14, 34, 44 are preferably stepping motors or the like capable of controlling the rotational position (phase), so that the rotational angle can be controlled with high accuracy.

Light source support apparatus 100 further includes a communication interface (I/F) 50, motor drivers 52, 54, 56, and a light source drive unit 58. Communication interface 50 decodes a control command from processing apparatus 300 to provide an internal command to motor drivers 52, 54, 56 and light source drive unit 58.

Following the internal command from communication interface 50, motor drivers 52, 54, 56 drive motors 14, 34, 44. Following the internal command from communication interface 50, light source drive unit 58 generates electric power for lighting the sample light source. Light source drive unit 58 then supplies the electric power to the sample light source through connectors 36 and 46. Thus, fixture jigs 32 and 42 which are a pair of support members for supporting the sample light source are capable of supplying electric power to the sample light source that they support.

<G. Procedure for Measurement>

Next, a description will be given of a procedure for measuring the luminous intensity distribution characteristic of a sample light source by means of measurement apparatus 1 according to the present embodiment. In the following, example processing for calculating the luminous intensity distribution characteristic by causing a primary rotation about vertical rotational axis Ax1 and also causing a secondary rotation about horizontal rotational axis Ax2 will be described by way of example.

Figure 14:
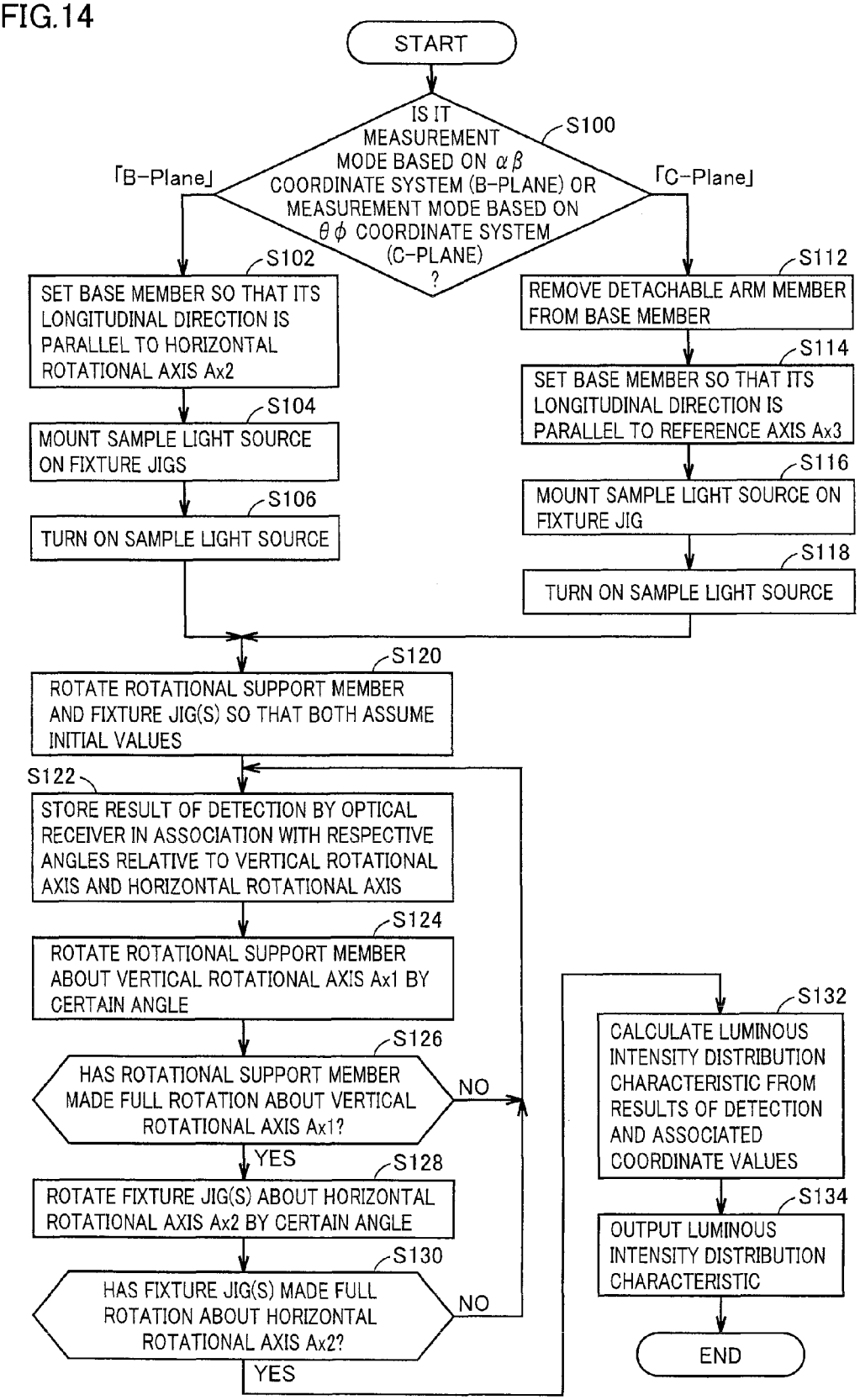
FIG. 14 is a flowchart showing a procedure for measuring the luminous intensity distribution characteristic of a sample light source by means of the measurement apparatus according to the present embodiment.

FIG. 14 is a flowchart showing a procedure for measuring the luminous intensity distribution characteristic of a sample light source by means of measurement apparatus 1 according to the present embodiment. Referring to FIG. 14, a user selects, depending on the type of a light source whose luminous intensity distribution characteristic is to be measured, one of the measurement mode based on the αβ coordinate system (B-Plane) shown in FIGS. 3 and 4 and the measurement mode based on the θφ coordinate system (C-Plane) shown in FIGS. 5 to 9 (step S100).

When the user has selected the measurement mode based on the αβ coordinate system (B-Plane) (in the case of "B-Plane" in step S100), the user sets base member 20 so that its longitudinal direction is parallel to horizontal rotational axis Ax2 (step S102). Subsequently, the user mounts the sample light source on fixture jigs 32 and 42 (step S104), and then turns on the sample light source (step S106).

In contrast, when the user has selected the measurement mode based on the θφ coordinate system (C-Plane) (in the case of "C-Plane" in step S100), the user removes detachable arm member 40 from base member 20 (step S112), and sets base member 20 so that its longitudinal direction is parallel to reference axis Ax3 (step S114). Subsequently, the user mounts the sample light source on fixture jig 32 (step S116), and then turns on the sample light source (step S118).

Subsequently, measurement of the luminous intensity distribution characteristic is started. Specifically, processing apparatus 300 causes rotational support member 12 as well as fixture jig 32 and/or fixture jig 42 to rotate so that their angles with respect to vertical rotational axis Ax1 and horizontal rotational axis Ax2 both assume initial values (step S120). Processing apparatus 300 stores the result of detection performed by optical receiver 200 in such a manner that associates the result with respective angles relative to vertical rotational axis Ax1 and horizontal rotational axis Ax2 (step S122). Subsequently, processing apparatus 300 causes rotational support member 12 to rotate about vertical rotational axis Ax1 by a certain angle (step S124). Processing apparatus 300 determines whether or not rotational support member 12 has made a full rotation about vertical rotational axis Ax1 (step 126).

When rotational support member 12 has not made a full rotation about vertical rotational axis Ax1 (NO in step S126), the steps including and subsequent to step S122 are performed again. In contrast, when rotational support member 12 has made a full rotation about vertical rotational axis Ax1 (YES in step S126), processing apparatus 300 causes fixture jig 32 and/or fixture jig 42 to rotate about horizontal rotational axis Ax2 by a certain angle (step S128).

Processing apparatus 300 then determines whether or not fixture jig 32 and/or fixture jig 42 has made a full rotation about horizontal rotational axis Ax2 (step S130).

When fixture jig 32 and/or fixture jig 42 has not made a full rotation about horizontal axis Ax2 (NO in step S130), processing apparatus 300 performs the steps including and subsequent to step S122 again. In contrast, when fixture jig 32 and/or fixture jig 42 has made a full rotation about horizontal axis Ax2 (YES in step S130), processing apparatus 300 calculates the luminous intensity distribution characteristic from the detection results repeatedly obtained in step S122 and their associated coordinate values (step S132).

Processing apparatus 300 then outputs the luminous intensity distribution characteristic calculated in step S132 (step S134). At this time, if the luminous intensity distribution characteristic has been obtained based on a spatial coordinate system different from a requested spatial coordinate system, a predetermined conversion process is performed so that the luminous intensity distribution characteristic is based on the requested spatial coordinate system, and the resultant luminous intensity distribution characteristic is output.

Although the above-described flowchart illustrates a process procedure in which a primary rotation is made about vertical rotational axis Ax1 and a secondary rotation is also made about horizontal rotational axis Ax2, the order in which the rotations are made about respective axes may be set as appropriate and the process procedure is not limited to the above-described one.

<H. Modification (Slide Mechanism)>

Next, a description will be given of a configuration of the above-described light source support apparatus in which a slide mechanism that enables the relative distance between the arms to be changed is employed to further enhance the versatility.

Figure 15:
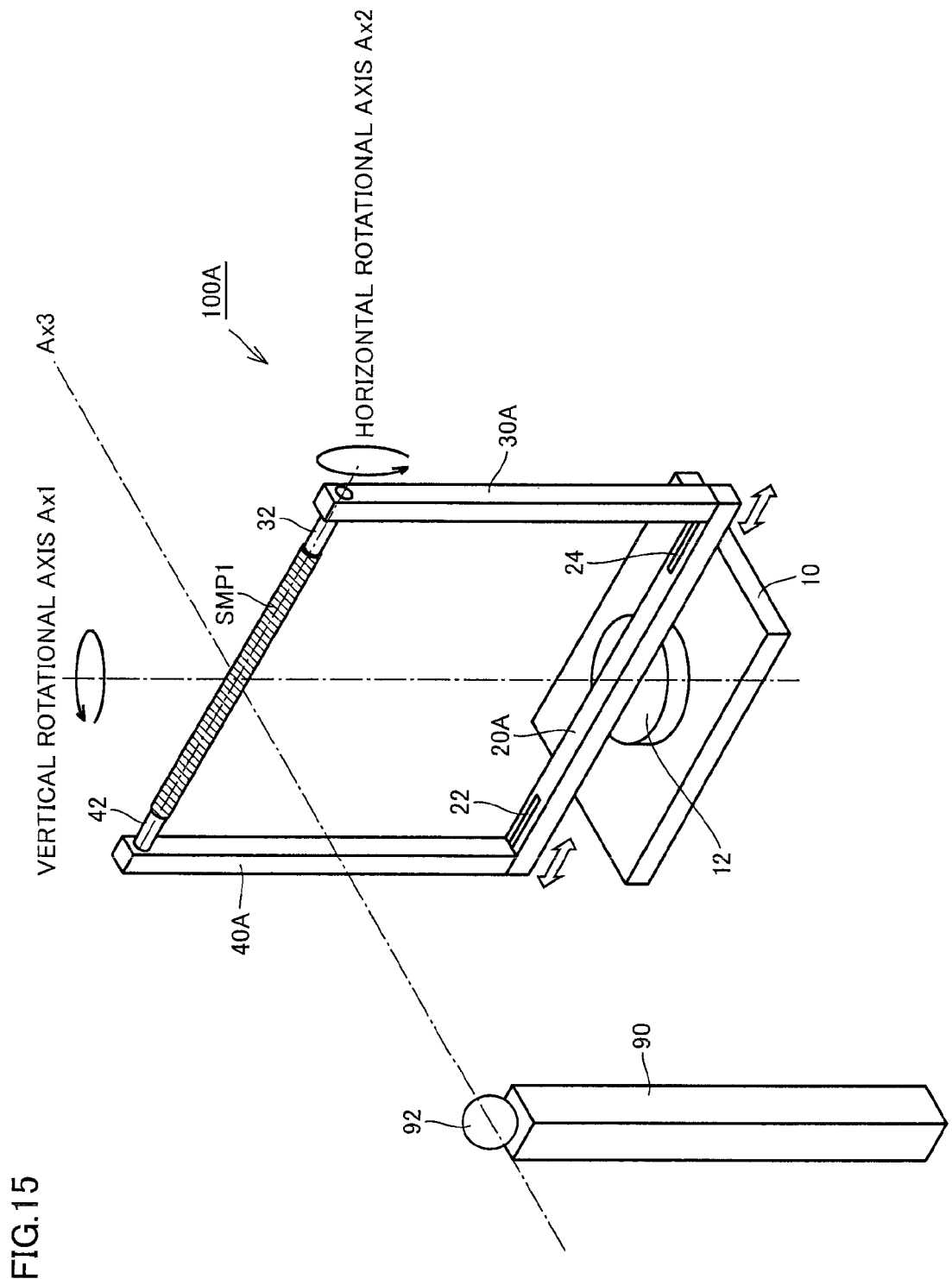
FIGS. 15 to 18 are each a perspective view showing a configuration of a light source support apparatus according to a modification of the present embodiment.

FIGS. 15 to 18 are each a perspective view showing the configuration of a light source support apparatus 100A according to a modification of the present embodiment. Referring to FIG. 15, light source support apparatus 100A according to the present modification differs from above-described light source support apparatus 100 in that a detachable arm member 30A and a detachable arm member 40A can slide along a base member 20A. The remaining basic features are similar to those of light source support apparatus 100, and therefore the detailed description of the remaining components will not be repeated.

More specifically, slide members 22 and 24 are provided respectively at the opposite ends of base member 20A. Slide members 22 and 24 enable detachable arm members 30A and 40A to relatively move along horizontal rotational axis Ax2. Namely, base member 20A includes a slide mechanism (slide members 22 and 24) that enables the distance between detachable arm member 30A and detachable arm member 40A to increase and decrease.

It is preferable to employ for example the double rack and pinion system between slide member 22 and slide member 24 so that respective slide amounts are equal to each other. Such a system can be employed to allow the central position between slide member 22 and slide member 24 to be kept on vertical rotational axis Ax1.

Figure 16:
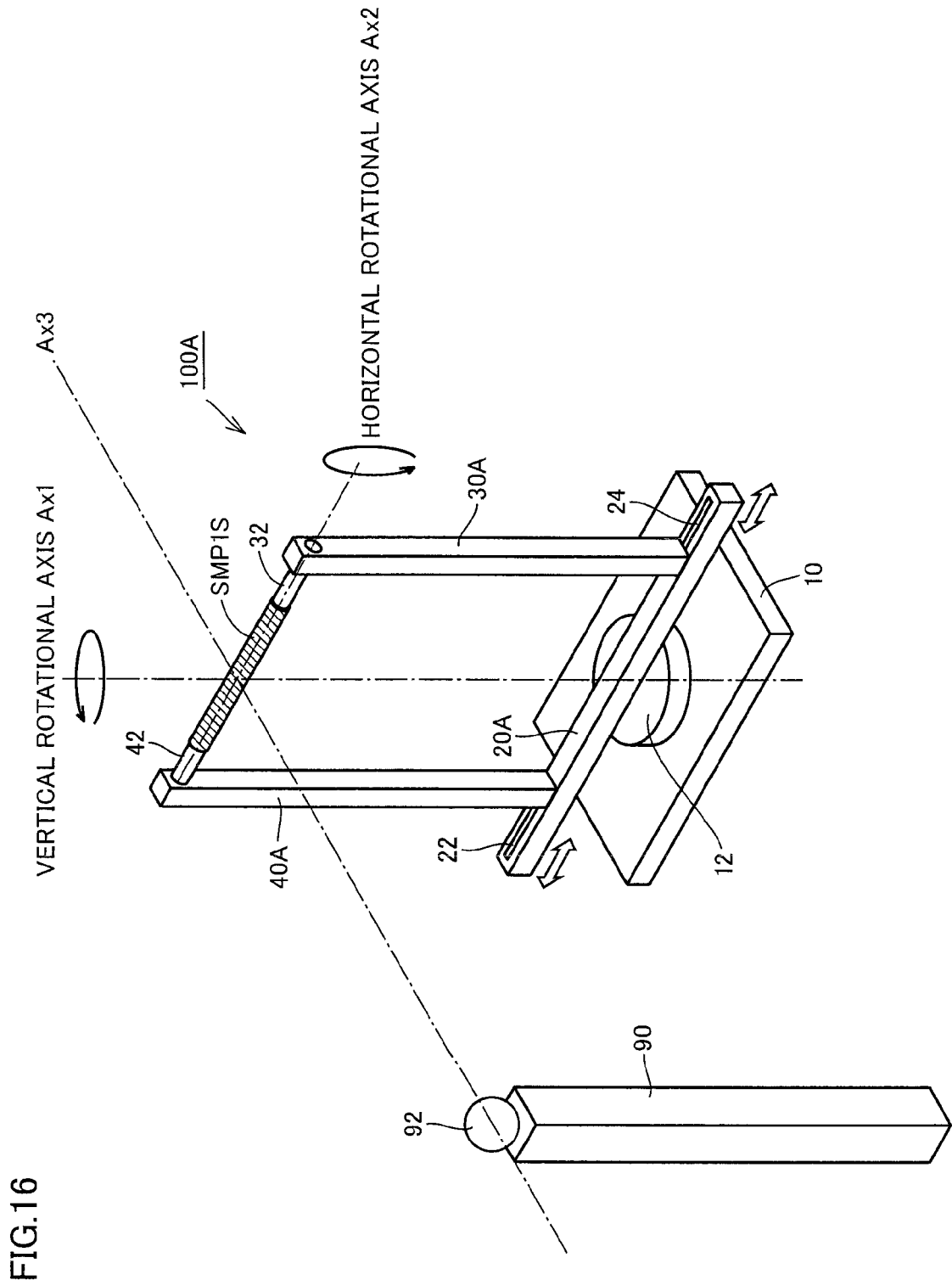

Such a slide mechanism is employed to enable, even if there are multiple different lengths of a rodlike sample light source SMP1S, the central position of its emission surface to meet the point of intersection between vertical rotational axis Ax1, horizontal rotational axis Ax2, and reference axis Ax3 as shown in FIG. 16. In other words, basically sample light source SMP1S of any length can be supported at the position where the measurement should be taken.

Figure 17:
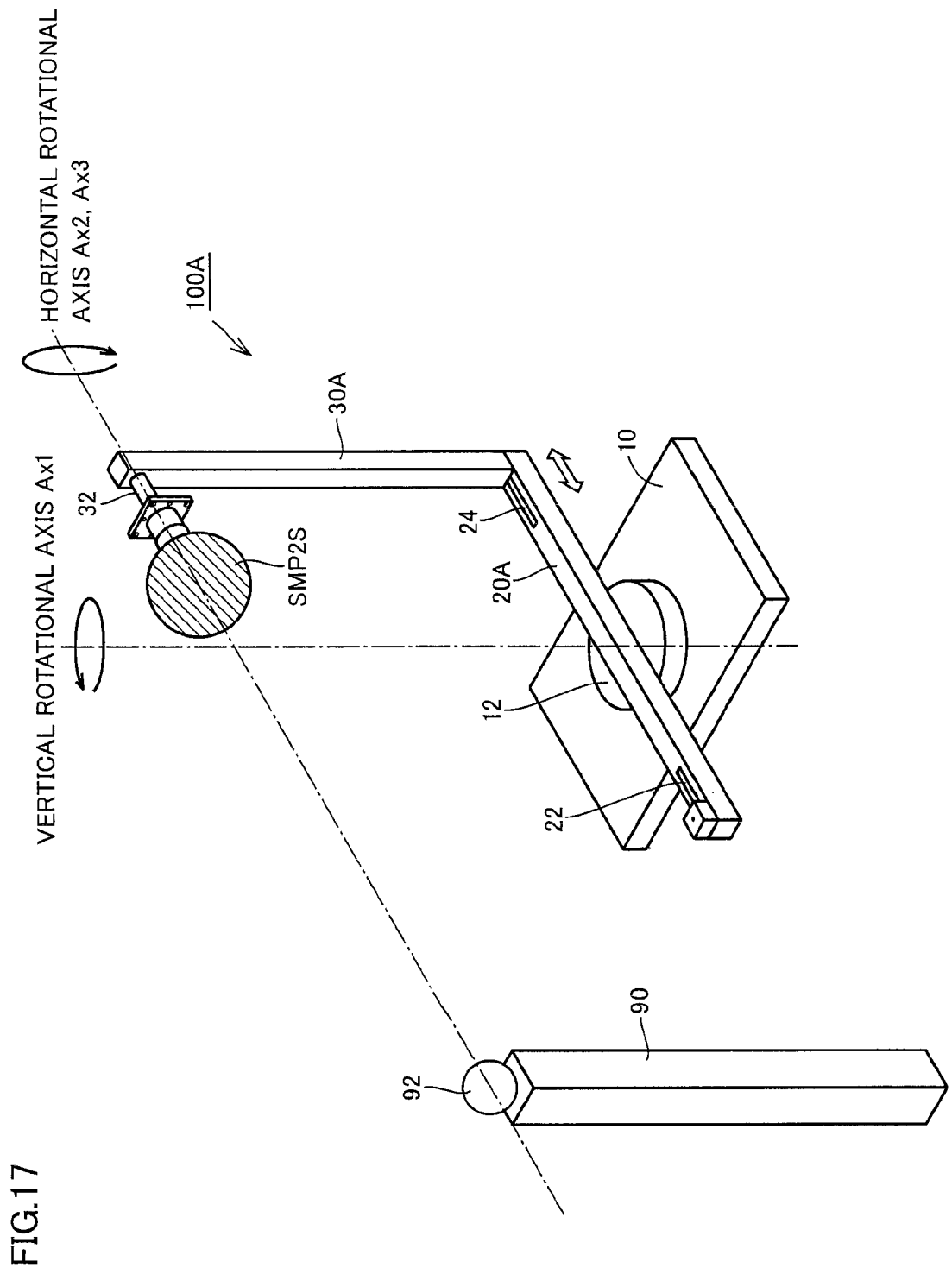
Figure 18:
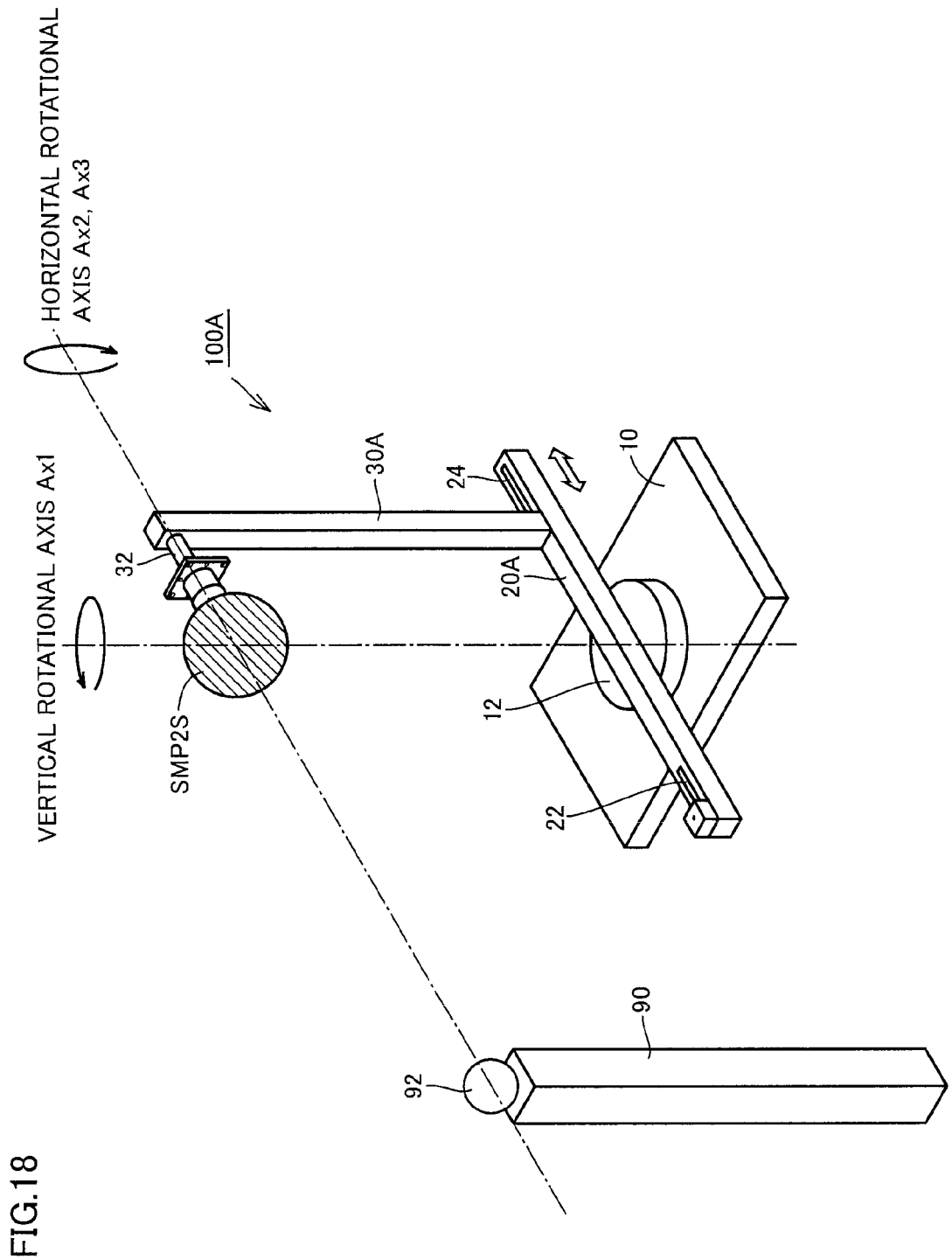

Moreover, in the case where spherical sample light source SMP2S is to be measured as well, the distance from the position of emission center to the plug may vary depending on the light source. In this case as well, the slide mechanism is employed to enable the central position of the emission part to meet the point of intersection between vertical rotational axis Ax1, horizontal rotational axis Ax1, and reference axis Ax3 as shown in FIGS. 17 and 18. In other words, basically sample light source SMP2S of any diameter can be supported at the position where the measurement should be taken.

As seen from the foregoing, the slide mechanism can be employed to measure the optical radiation characteristic of light sources of different types by means of a common light source support apparatus 100, without being influenced by the longitudinal length of rodlike sample light source SMP1S and the distance from the central position of emission of spherical sample light source SMP2S to the plug, for example.

<I. Modification (Correction for Characteristic Change Due to Temperature Change)>

In general, surface light sources such as LED and organic EL are less likely to change in their optical radiation characteristic which is caused by a temperature change. One of the reasons for this is that the amount of heat generated by the surface light source is small. In contrast, regarding the fluorescent lamp and the like, an extended lighting time and/or a change in the ambient environment causes a local temperature increase. Such a temperature change may cause a change in the optical radiation characteristic. In particular, when the luminous intensity distribution characteristic is to be measured with higher accuracy, it is necessary to measure the luminous intensity of the sample light source at an increased number of measurement points, resulting in a problem that the time required for measurement increases and accordingly the temperature of the sample light source changes.

In view of the above, the sample light source may be returned to a predetermined basic lighting posture while its luminous intensity distribution characteristic is being measured. The luminous intensity of the sample light source in this posture is measured. Then, the measured luminous intensity at the basic lighting posture may be used to correct the values of the measurement around the time when the luminous intensity is measured at the basic lighting posture.

More specifically, in the initial stage in which measurement is started, the sample light source is supported in a basic lighting posture and the luminous intensity of the sample light source measured at this time is used as a reference value for correction. Then, the luminous intensity of the light source is measured at a predetermined number of positions. After the predetermined number of measurements is taken, the sample light source is again supported in the basic lighting posture and the luminous intensity of the sample light source in this lighting posture is measured. From the measured luminous intensity and the reference value for correction, a correction coefficient is calculated. Then, the calculated correction coefficient is used to correct the luminous intensity of the preceding measurement and the luminous intensity of the subsequent measurement. If the measured luminous intensity is identical to the reference value, the correction coefficient is almost "1" and therefore, the measured luminous intensity is not substantially corrected. In contrast, if the measured luminous intensity is significantly different from the reference value, the correction coefficient is a value other than "1" and therefore the measured luminous intensity is corrected to a value appropriate for the optical radiation characteristic of the sample light source at this time.

Such a correction process can periodically be performed to obtain, even if the sample light source changes in its optical radiation characteristic during measurement of the luminous intensity distribution characteristic, the luminous intensity with its change corrected.

<J. Advantages>

Optical radiation characteristic measurement apparatus 1 (light source support apparatus 100 and optical receiver 200) according to the present embodiment is capable of measuring the optical radiation characteristic (luminous intensity distribution characteristic) of not only rodlike sample light sources such as straight-tube type fluorescent lamp but also spherical sample light sources such as incandescent bulb, fluorescent bulb, and LED bulb. Therefore, it is unnecessary to prepare the measurement apparatuses respectively for different types of sample light sources, and thus economy and convenience for the user can be improved.

Further, optical characteristic measurement apparatus 1 according to the present embodiment does not require a considerably large height of the space for measurement. Even if the height of the space where the apparatus is installed is on the order of 3 m, the optical radiation characteristic (luminous intensity distribution characteristic) of a fluorescent lamp having a length of 1.2 m can be measured with high accuracy.

Furthermore, optical radiation characteristic measurement apparatus 1 according to the present embodiment is capable of freely adjusting the distance between light source support apparatus 100 and optical receiver 200 and therefore capable of measuring the optical radiation characteristic (luminous intensity distribution characteristic) of a large variety of sample light sources including light sources with a relatively low intensity of light emitted from the light sources and light sources with a relatively high intensity of light emitted therefrom.

Namely, optical radiation characteristic measurement apparatus 1 according to the present embodiment is restricted to little extent in terms of the photometric distance and the type and size of the light source, and can thus achieve higher versatility. In addition, the apparatus has a simple configuration and therefore has an advantage that its whole size can be reduced.

Moreover, optical radiation characteristic measurement apparatus 1 according to the present embodiment rotates a sample light source mounted on light source support apparatus 100 to thereby change the lighting posture (particularly the relative orientation with respect to the direction of gravity) of the light source. For light sources such as LED and organic EL, the influence of the change of the lighting posture can substantially be ignored. Therefore, the method for measurement according to the present embodiment can still keep the accuracy of measurement. For light sources which change in its optical radiation characteristic (luminous intensity distribution characteristic) with time depending on the lighting posture, the correction process explained above in connection with the modification can additionally be performed to keep the accuracy of measurement.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A light source support apparatus comprising:
a base member;
a first support member supporting said base member rotatably about a first axis;
first and second arm members connected respectively to opposite ends of said base member and extending in a direction parallel to said first axis; and
a pair of second support members disposed at respective positions, which are opposite to each other, of said first and second arm members for supporting a sample light source,
said pair of second support members being configured to be able to rotate the supported sample light source about a second axis orthogonal to said first axis, and
said base member having at least one end serving as a connection portion, at least one of said first and second arm members being attachable to and detachable from the connection portion.

2. The light source support apparatus according to claim 1, wherein said first support member is configured to be able to fix said base member in a state where a longitudinal direction of said base member is parallel to said second axis.

3. The light source support apparatus according to claim 1, wherein said first support member is configured to be able to fix said base member in a state where a longitudinal direction of said base member is parallel to a third axis orthogonal to both said first and second axes.

4. The light source support apparatus according to claim wherein said base member includes a slide mechanism capable of increasing and decreasing a distance between said first arm member and said second arm member.

5. The light source support apparatus according to claim wherein said pair of second support members is configured to be able to supply electric power to the supported sample light source.

6. An optical radiation characteristic measurement apparatus, comprising:
  a light source support member on which a sample light source is mounted; and
  an optical receiver receiving light from said sample light source,
  said light source support member including:
    a base member;
    a first support member supporting said base member rotatably about a first axis;
    first and second arm members connected respectively to opposite ends of said base member and extending in a direction parallel to said first axis; and
    a pair of second support members disposed at respective positions, which are opposite to each other, of said first and second arm members for supporting the sample light source,
    said pair of second support members being configured to be able to rotate the supported sample light source about a second axis orthogonal to said first axis, and
    said base member having at least one end serving as a connection portion, at least one of said first and second arm members being attachable to and detachable from the connection portion.

7. The optical radiation characteristic measurement apparatus according to claim 5, wherein said first support member is configured to be able to fix said base member in a state where a longitudinal direction of said base member is parallel to said second axis.

8. The optical radiation characteristic measurement apparatus according to claim 6, wherein said first support member is configured to be able to fix said base member in a state where a longitudinal direction of said base member is parallel to a third axis orthogonal to both said first and second axes.

9. The optical radiation characteristic measurement apparatus according to claim 6, wherein said base member includes a slide mechanism capable of increasing and decreasing a distance between said first arm member and said second arm member.

10. The optical radiation characteristic, measurement apparatus according to claim 6, wherein said pair of second support members is configured to be able to supply electric power to the supported sample light: source.

11. A light source support apparatus comprising:
  a base member;
  a first support member supporting said base member rotatably about a first axis;
  first and second arm members connected respectively to opposite ends of said base member and extending in a direction parallel to said first axis; and
  a pair of second support members disposed at respective positions, which are opposite to each other, of said first and second arm members for supporting a sample light source,
  said pair of second support members being configured to be able to rotate the supported sample light source about a second axis orthogonal to said first axis,
  at least one of said first and second arm members being configured to be attachable to and detachable from said base member, and
  wherein said base member includes a slide mechanism capable of increasing and decreasing a distance between said first arm member and said second arm member.

12. An optical radiation characteristic measurement apparatus, comprising:
  a light source support member on which a sample light source is mounted; and
  an optical receiver receiving light from said sample light source,
  said light source support member including:
    a base member;
    a first support member supporting said base member rotatably about a first axis;
    first and second arm members connected respectively to opposite ends of said base member and extending in a direction parallel to said first axis; and
    a pair of second support members disposed at: respective positions, which are opposite to each other, of said first and second arm members for supporting the sample light source,
    said pair of second support members being configured to be able to rotate the supported sample light source about a second axis orthogonal to said first axis,
    at least one of said first and second arm members being configured to be attachable to and detachable from said base member, and
    wherein said base member includes a slide mechanism capable of increasing and decreasing a distance between said first arm member and said second arm member.

* * * * *